(12) United States Patent
Sawai et al.

(10) Patent No.: US 6,258,969 B1
(45) Date of Patent: Jul. 10, 2001

(54) POLYALKOXYSILOXANE AND PROCESS FOR ITS PRODUCTION

(75) Inventors: Takeshi Sawai; Hanako Kato; Seiichiro Tanaka; Akihiro Takazawa, all of Fukuoka; Haruo Katsumata, Tokyo; Hozumi Endo, Fukuoka, all of (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 08/726,301

(22) Filed: Oct. 2, 1996

(30) Foreign Application Priority Data

| Oct. 6, 1995 | (JP) | 7-259995 |
| Oct. 9, 1995 | (JP) | 7-261382 |
| Oct. 11, 1995 | (JP) | 7-262691 |
| Oct. 20, 1995 | (JP) | 7-272433 |
| Oct. 20, 1995 | (JP) | 7-272434 |

(51) Int. Cl.$^7$ .................. C07F 7/08; C07F 7/10
(52) U.S. Cl. .............. 556/457; 556/458; 556/425; 556/414; 556/428; 549/215; 528/26; 528/32; 528/33; 528/38
(58) Field of Search .............. 572/457; 556/458, 556/414, 429; 549/215; 528/26, 32, 33, 38

(56) References Cited

U.S. PATENT DOCUMENTS 5,223,636 * 6/1993 Koshimura et al. .......... 556/457
5,563,231 * 10/1996 Barringer, Jr. et al. .......... 56/457
5,605,997 * 2/1997 Yamamoto et al. .......... 528/10
5,830,970 * 11/1998 Cobb et al. .......... 556/445

FOREIGN PATENT DOCUMENTS

| 568 545 | 1/1933 | (DE) . |
| 1 015 418 | 9/1957 | (DE) . |
| 1 300 289 | 7/1969 | (DE) . |
| 2 155 281 | 5/1973 | (DE) . |
| 0 287 877 | 10/1988 | (EP) . |
| 0 313 095 | 4/1989 | (EP) . |
| 0 736488 | 10/1996 | (EP) . |
| 0 757 079 | 2/1997 | (EP) . |
| WO 95/17349 | 6/1995 | (WO) . |

OTHER PUBLICATIONS

Derwent Publications, 95–126210/199517, JP 7048454, Feb. 21, 1995.

Patent Abstracts of Japan, vol. 95, No. 5, Jun. 30, 1995, JP 07 048454, Feb. 21, 1995.

* cited by examiner

*Primary Examiner*—Paul F. Shaver
(74) *Attorney, Agent, or Firm*—Oblon, Spivak, McClelland, Maier & Neustadt, P.C.

(57) ABSTRACT

A polyalkoxysiloxane of the following rational formula:

$$SiO_a(OR)_b(OH)_c$$

wherein R is a $C_{1-4}$ alkyl group, a=0.86 to 1.30, b=2.18 to 1.30, and c≦0.10.

18 Claims, 14 Drawing Sheets

POLYALKOXYSILOXANE AND PROCESS FOR ITS PRODUCTION

The present invention relates to a novel polyalkoxysiloxane, a process for its production, and its applications.

In recent years, siloxane compounds having $(SiO)_n$ units have been used alone or in combination with an organic component such as an organic polymer for applications to e.g. a hard coat, an exterior wall coating, a material for a sand mold for casting and an adhesive to improve e.g. scuff resistance, stain resistance and adhesiveness. Among them, an attention has been drawn particularly to a polyalkoxysiloxane which is a partially hydrolyzed condensate of an alkoxysilane having alkoxy groups bonded to silicon. As such a polyalkoxysilane compound, a polyethoxysiloxane has heretofore been used, which is a low condensate of tetraethoxysilane (TEOS) having ethoxy groups as the alkoxy groups. However, this compound usually has a low reactivity, and also theoretically, there is a limit in the silica-converted concentration. Accordingly, the inorganic properties of the silica component can not adequately be utilized. Also known is a polymethoxysiloxane which is a condensate of tetramethoxysilane (TMOS) having methoxy groups as the alkoxy groups. This compound has a characteristic that as compared with the polyethoxysilane, a liquid product having a higher Si content per unit weight can be obtained. However, there has been a problem such that it is difficult to control the reaction for the preparation of this polymethoxysiloxane, the obtained product is susceptible to a property change or gelation, or the monomer is highly toxic and if remained in the product, it is likely to create a safety problem in the use of the product. Under the circumstances, a polysiloxane oligomer represented by the following chemical formula has been proposed wherein the monomer content is reduced to a level of at most 1% to improve the storage stability and safety (Japanese Unexamined Patent Patent Publication No. 48454/1995):

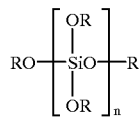

$R = C_{1-6}$ alkyl group
$n = 2$ to $10$

These conventional polyalkoxysiloxane compounds have such a nature that when the hydrolytic condensation reaction of alkoxy groups is completely proceeded, they finally form inorganic silica as shown in the following reaction formulas.

Hydrolytic reaction $\equiv SiOR + H_2O \rightarrow \ \equiv SiOH + ROH$

Condensation reaction

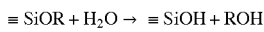

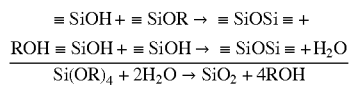

Generally, the smaller the carbon number of alkoxy groups, the higher the activity, and the quicker the hydrolytic condensation reaction. Accordingly, it is considered that as compared with a polyethoxysiloxane wherein the alkoxy groups are ethoxy groups, a polymethoxysiloxane wherein the alkoxy groups are methoxy groups, is rich in the reactivity, whereby formation of silica as an inorganic substance is quick, and the performance of the properties is remarkable.

Utilizing such a nature of the polymethoxysiloxane, an attempt has been made to use it alone or in combination with an organic component such as an organic polymer for an application to e.g. a hard coat, an external wall coating, a material for a sand mold for casting or an adhesive to improve e.g. scuff resistance, stain resistance or adhesiveness.

Liquid polymethoxysiloxanes so far available all had a Si content as $SiO_2$ of not higher than 53 wt %. In order to increase the Si content, it is necessary to increase the degree of hydrolysis of the alkoxy groups of the polymethoxysiloxane to obtain a highly condensed product. However, synthesis of a highly condensed product has a problem such that silanol groups are likely to remain, whereby completion of the reaction is difficult, and the reaction gradually proceeds during the storage of the product to form a three dimensional structure, whereby the product tends to be geled. Accordingly, it has been difficult to obtain on an industrial scale a liquid polyalkoxysiloxane having a high silica content and being excellent in the storage stability without change with time.

Further, conventional polymethoxysiloxanes usually have a low flash point which is usually from 30 to 40° C. and thus are designated as dangerous goods in class 4-2. As a polymethoxypolysiloxane having a high flash point, "MKC silicate MS51" manufactured by Mitsubishi Chemical Corporation, is available, but even with this product, the flash point is at a level of 126° C.

In order to solve such problems, it has been desired to develop a liquid polyalkoxysiloxane which is a highly condensed product having the degree of polymerization increased over conventional polyalkoxysiloxanes and which has a high Si content and a high flash point.

Under these circumstances, the present inventors have conducted extensive studies and as a result, have succeeded in obtaining a novel polyalkoxysiloxane which is a highly condensed product having a high degree of polymerization and which has a high Si content and a high flash point and yet is capable of being present stably in a liquid state, as compared with conventional polyalkoxysiloxanes. The present invention has been accomplished on the basis of this discovery.

Namely, the present invention provides:

(1) A polyalkoxysiloxane of the following rational formula:

$SiO_a(OR)_b(OH)_c$ wherein R is a $C_{1-4}$ alkyl group, preferably a methyl group or an ethyl group, a=0.86 to 1.30, b=2.18 to 1.30, and $c \leq 0.10$;

(2) A polyalkoxysiloxane having a flash point of at least 130° C.;

(3) A polyalkoxysiloxane having a silica-converted concentration of at least 53 wt %;

(4) A polyalkoxysiloxane having a weight average molecular weight of from 600 to 3,000, a molecular weight distribution within ranges of Mw/Mn=1.4 to 2.7 and Mz/Mw=1.5 to 4.0, and a viscosity at 25° C. of from 10 to 1,000 cp;

(5) The polyalkoxysiloxane according to any one of (1) to (4), wherein the content of tetraalkoxysilane monomer is at most 0.5 wt %;

(6) The polyalkoxysiloxane according to any one of (1) to (5), wherein the content of an alcohol is at most 0.5 wt %;

(7) A process for producing the polyalkoxysiloxane according to any one of (1) to (6), which comprises reacting tetraalkoxysilane with from 0.80 to 1.30 mol times thereto of water for hydrolytic condensation under reflux, then distilling off an alcohol formed by the hydrolytic condensation and a solvent for reaction if used, at the boiling point, and then further distilling off components fractionated at from 120 to 200° C.

(8) A silicon-containing composition or the like, which comprises the polyalkoxysiloxane according to any one of (1) to (6) and an organic compound capable of condensing therewith.

Figure 1:
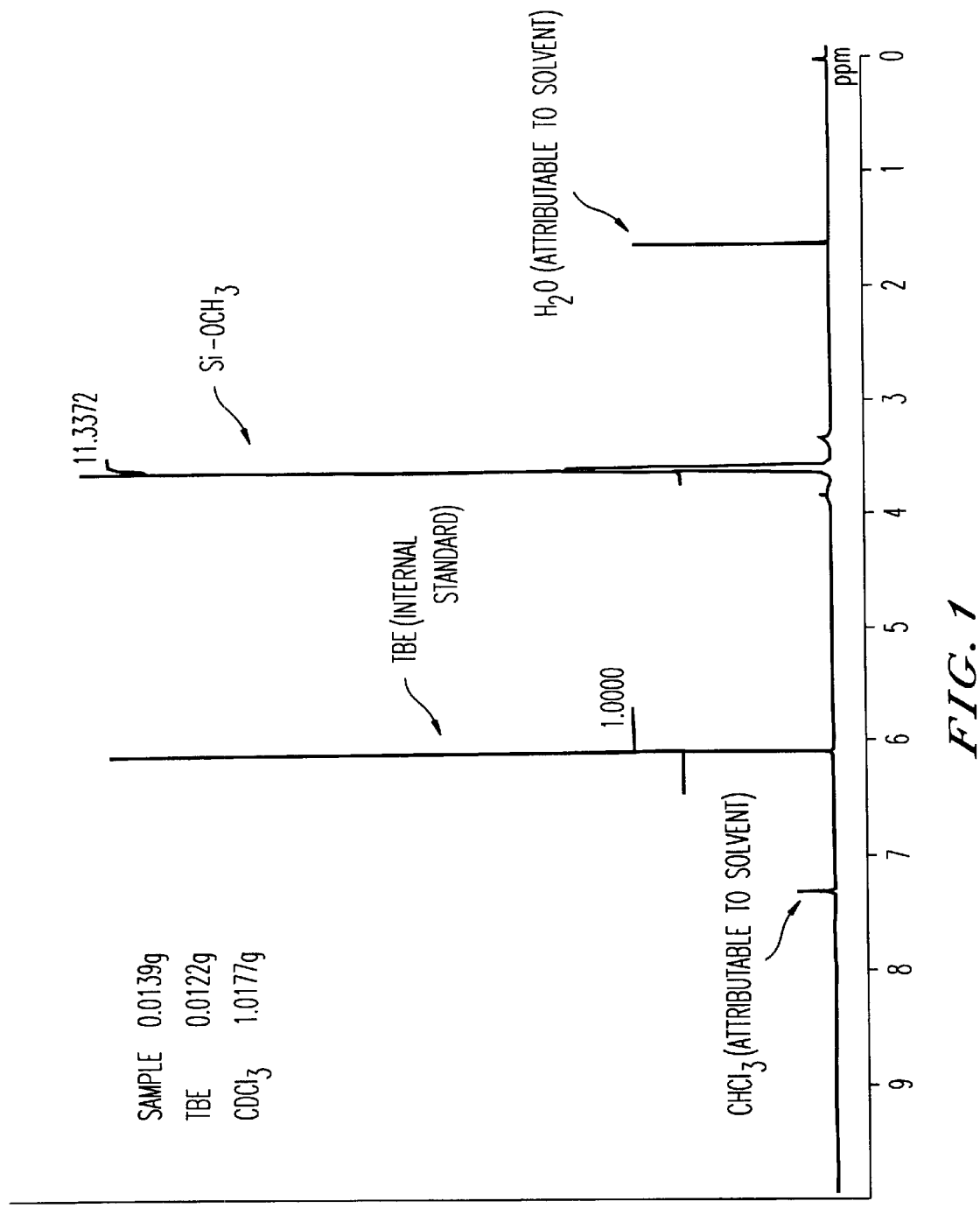
FIG. 1 is a $^1$H-NMR chart of polymethoxysiloxane ① obtained in Example 1.

Now, the present invention will be described in detail with reference to the preferred embodiments.

Firstly, the polyalkoxysiloxane of the present invention is the one represented by the following rational formula:

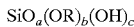

$$SiO_a(OR)_b(OH)_c$$

wherein R is a $C_{1-4}$ alkyl group, preferably a methyl group or an ethyl group, most preferably a methyl group, a=0.86 to 1.30, b=2.18 to 1.30, and c≦0.10.

Preferably, a is from 0.90 to 1.20. If a<0.86, the weight average molecular weight of the obtained polyalkoxysiloxane will be less than 600, and the Si content as $SiO_2$ will be less than 53 wt %. Such a compound is far inferior in providing the effects such as scuff resistance, stain resistance, etc. when combined with an organic component such as an organic polymer. Further, it has a problem that the flash point tends to be lower than 130° C. If a>1.30, the obtained polyalkoxysiloxane tends to be highly susceptible to gelation. Further, if c>0.10, the obtained polyalkoxysiloxane tends to undergo a compositional change during the storage. On the other hand, b is necessarily determined from a related formula of b=4−2a−c, once a and c are determined.

The polyalkoxysiloxane of the present invention which has a Si content no less than 53%, when blended with organic component and be cured to form a cured product, properties such as stain resistance, weather resistance and hydrophilic nature are dramatically improved as compared to the conventional polyalkoxysiloxane, even when small amount is added.

To obtain such a polyalkoxysiloxane of the present invention, the following method may, for example, be employed. Namely, tetraalkoxysilane of the formula $Si(OR)_4$ wherein R is as defined above, is subjected to partial hydrolytic condensation by the following specific method.

Among tetraalkoxysilanes, it is particularly preferred to employ tetramethoxysilane $(Si(OCH_3)_4)$, whereby the Si content can readily be increased. Here, the tetraalkoxysilane may be obtained, for example, by a reaction of silicon with an alcohol, a reaction of a silicon halide with an alcohol, or an ester exchange reaction of an alkoxysilane. It is preferred to employ a method of reacting silicon with an alcohol, whereby prevention of residual halogen elements is easy.

Firstly, to tetraalkoxysilane, from 0.80 to 1.30 mol times, preferably from 0.86 to 1.20 mol times, of water is added and reacted. If the amount of water is less than 0.80 mol times, a in the above rational formula of the resulting polyalkoxysiloxane will be less than 0.86. On the other hand, if the amount exceeds 1.30 mol times, a is likely to exceed 1.30, and the resulting polyalkoxysiloxane tends to be susceptible to gelation and poor in the storage stability, whereby it will be difficult to use such a product.

For the reaction, a catalyst may suitably be used, as the case requires. For example, an inorganic acid such as hydrochloric acid, sulfuric acid, nitric acid or phosphoric acid, or an organic acid such as formic acid, acetic acid, oxalic acid, maleic acid, benzenesulfonic acid or an alkylbenzenesulfonic acid may, for example, employed. However, hydrochloric acid is preferred, since it can readily be removed by distillation after completion of the reaction. The amount of hydrochloric acid to be used, is usually from $1 \times 10^{-6}$ to $1 \times 10^{-2}$ mol time, preferably from $1 \times 10^{-5}$ to $1 \times 10^{-3}$ mol time, as HCl, to the tetraalkoxysilane.

Further, the reaction can be carried out in the presence of a solvent. A water-soluble organic solvent such as an alcohol e.g. methanol, an ether or a ketone, may, for example, be used. However, taking into consideration the possible ester exchange reaction of alkoxy groups and the easiness of solvent recovery, same kind of alcohol as the one formed as a by-product from the hydrolytic reaction is most preferred as the solvent. The amount of the solvent to be used, is usually from 0.1 to 10 times by weight, preferably from 0.1 to 0.5 time by weight, to the tetraalkoxysilane.

For the partial hydrolytic condensation reaction of tetraalkoxysilane to obtain the polyalkoxysiloxane of the present invention, the predetermined amount of water is added, if necessary, with stirring. Then, the hydrolytic reaction is proceeded, preferably under heating. Here, the reaction is carried out under reflux at a temperature close to the boiling point of the solvent or to the boiling point of the alcohol formed as by-product.

The reaction time under reflux is usually from 0.5 to 10 hours, preferably from 1 to 5 hours, although it depends also on the type of the catalyst.

Then, the alcohol formed as by-product by the partial hydrolytic condensation reaction, is distilled off. For this method, various distillation or evaporation operations may be employed. Namely, there may be a method of distilling off the alcohol by heating at a temperature of at least the boiling point of the alcohol, or a method of distilling off the alcohol by introducing an inert gas such as nitrogen, carbon dioxide gas, argon or helium even at a temperature lower than the boiling point. Industrially, a method of distilling off the alcohol by heating until the internal temperature reaches to a level of from 80 to 130° C., preferably from 100 to 120° C., under atmospheric pressure, is suitable. The distillation time is not particularly limited, but is usually from 1 to 5 hours. In an industrial operation, the temperature is raised to a level within this range and kept at that level for from 0.5 to 10 hours, preferably from 1 to 5 hours, to promote the condensation reaction of silanol groups while continuing the distillation of the alcohol. After distilling off the alcohol substantially completely in this manner, distillation is further continued at a temperature of from 120 to 200° C., preferably from 130 to 170° C., for from 1.5 to 10 hours, preferably from 1 to 5 hours, for the purpose of completing the condensation reaction of any remaining silanol groups. This completion of the condensation is important to obtain a polyalkoxysiloxane of the above rational formula.

If the temperature exceeds 200° C., the obtained polyalkoxysiloxane tends to undergo a depolymerization reaction to form a monomer and a high molecular weight compound and to let the inner liquid undergo gelation, such being undesirable. For this operation for completion, various distillation or evaporation operations may be used as in the case for the distillation of the alcohol. Namely, a method of distilling off under atmospheric pressure or reduced pressure by heating at a temperature of at least the boiling point of the solution, or a method of blowing an inert gas such as nitrogen, carbon dioxide, argon or helium at a space velocity (SV) of from 1 to 100 $hr^{-1}$ even under heating at a temperature lower than the boiling point, is most convenient.

Thus, the polyalkoxysiloxane of the present invention which is useful for various applications, can be obtained by a relatively simple and easy method.

The above-described production method is a typical method for obtaining the polyalkoxysiloxane of the present invention. Needless to say, the polyalkoxysiloxane of the present invention may be obtained by other methods.

Thus, the polyalkoxysiloxane may be prepared by the process of the present invention to have a Si content as $SiO_2$ of at least 53 wt %.

Further, the polyalkoxysiloxane of the present invention can be made to be a liquid having high storage stability. Especially when the alcohol-converted OH concentration is at most 0.5 wt %, particularly at most 0.1 wt %, the storage stability of the liquid becomes excellent, although the reason is not clearly understood. A method for bringing OH within the above range, is not particularly limited. For example, in a case where the polyalkoxysiloxane obtained by the above process has OH exceeding the above range, such OH may be converted to an alkoxy group by condensation.

Here, "alcohol" in the alcohol-converted OH concentration, is an alcohol corresponding to the alkoxy group of the polyalkoxysiloxane, i.e. an alcohol represented by R—OH having the same R as R in the alkoxy group (RO—).

The above alcohol-converted OH concentration may, for example, be measured as follows. For the measurement of the OH concentration, a highly sensitive Fourier transform infrared spectrophotometer (FT-IR) is used for accuracy, and the OH concentration can be calculated by using an absorption coefficient of a hydroxyl group of an alcohol as an absorption coefficient of a silanol group by a difference spectrum method wherein the absorption spectrum of the contained alcohol is subtracted from the absorption spectrum of the polyalkoxysiloxane.

Further, the polyalkoxysiloxane of the present invention can be made to have a feature that the molecular weight distribution is within ranges of Mw/Mn=1.4 to 2.7 and Mz/Mw=1.5 to 4.0. Preferably, Mw/Mn=1.5 to 2.5 and Mz/Mw=1.7 to 3.5. A polysiloxane of the present invention having the above molecular weight distribution shows excellent performance such as stain resistance, weather resistance, hydrophilic nature when added to an organic component and cured. Also, such polyalkoxysiloxane has a merit that the amount volatized during curation is low. Further, the weight average molecular weight may exceed 600. Namely, the polysiloxane of the present invention can be made to have a weight average molecular weight of from 600 to 3,000 as measured by GPC. For example, the weight average molecular weight may be from 700 to 2,500. Such a polyalkoxysiloxane has never been available before. If the weight average molecular weight exceeds 3,000, the polyalkoxysiloxane tends to be geled. On the other hand, if the weight average molecular weight is less than 600, it tends to be difficult to bring the flash point to a level of at least 130° C. The above weight average molecular weight is a value obtained by calculation as standard polystyrene from the value measured by GPC. Such a polyalkoxysiloxane of the present invention may have a storage stability such that it can be maintained in a transparent liquid state without any compositional change for more than one year.

Further, by the present invention, it is possible to obtain a polyalkoxysiloxane having a flash point of at least 130° C. Even polyalkoxysiloxane having a flash point of at least 150° C. can be obtained.

Further, the polyalkoxysiloxane of the present invention can be made to have a viscosity at 25° C. of from 10 to 1,000 cP. If the viscosity is less than 10 cP, sometimes it is difficult to apply it on a substrate to form a hard coat, as the liquid doesn't have enough viscosity and flow away from the substrate. Also, it tends to be difficult to bring the flash point to a level of at least 130° C. On the other hand, if it exceeds 1,000 cP, the polyalkoxysiloxane tends to be geled, whereby its use tends to be difficult. Within the above range, the viscosity is preferably from 15 to 500 cP, more preferably from 15 to 200 cP, whereby the stability in a liquid state, and the properties for film-forming will be excellent.

Further, safety for workers in the case of an industrial operation is improved, as the content of highly toxic tetramethoxysilane monomer can be controlled to be not higher than 0.5 wt %, and the content of alcohol as solvent or by-product can be controlled to be no higher than 0.5 wt %. Accordingly, it is regarded as a very useful highly concentrated silicon-containing liquid material.

The polymethoxysiloxane of the present invention has a storage stability for more than one year and is capable of maintaining transparency and a liquid state free from compositional change, in spite of its high degree of polymerization and high Si content as $SiO_2$.

Such a polyalkoxypolysiloxane has heretofore been non-existent. The polyalkoxysiloxane of the present invention thus having characteristics different from the conventional polyalkoxysiloxanes, can be used, for example, as a hydrolyzed solution for a hard coat, or as blended to various resins for imparting a hydrophilic nature or improving stain resistance, acid resistance or weather resistance, or for various applications such as an application to e.g. a sand mold for casting.

The above-mentioned polyalkoxysiloxane may be formed into a silicon-containing composition by blending thereto a reactive organic compound having a functional group capable of condensing therewith and/or a group capable of forming a group capable of condensing therewith by hydrolysis. Namely, the reactive organic compound is an organic compound having a group capable of hydrolytically condensing with an alkoxy group of the polyalkoxysiloxane of the present invention, and/or an organic compound capable of forming a group capable of hydrolytically condensing with an alkoxy group of a polyalkoxysiloxane of the present invention, by hydrolysis.

Such a reactive organic compound may, for example, be a compound having a carboxyl group, a hydroxyl group or an alkoxy group. The molecular weight is preferably at most 2,000. Specifically, it may, for example, be (i) a silane coupler (generally R'SiX$_3$ wherein X is a hydrolyzable group, and R' is a organic group), or (ii) an active hydrogen-containing compound.

More specifically, the silane coupler (i) may, for example, be a methyl acrylate type silane coupler such as

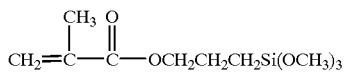

an epoxy type silane coupler such as

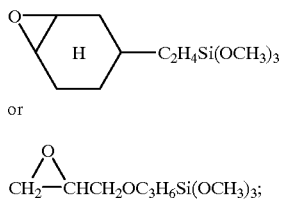

an amino type silane coupler such as
H$_2$NC$_3$H$_6$Si(OC$_2$H$_5$)$_3$,
H$_2$NC$_2$H$_4$NHC$_3$H$_6$Si(OCH$_3$)$_3$ or
H$_2$NCONHCH$_3$H$_6$Si(OC$_2$H$_5$)$_3$;
a vinyl type silane coupler such as
CH$_2$=CHSi(OC$_2$H$_5$)$_3$,
CH$_2$=CHSi(OCH$_3$)$_3$ or
CH$_2$=CHSi(OC$_2$H$_4$OCH$_3$)$_3$ or
a mercapto type silane coupler such as
HS—C$_3$H$_6$Si(OCH$_3$)$_3$, HS—C$_3$H$_6$Si(OC$_2$H$_5$)$_3$ or
HS—C$_3$H$_6$Si(OC$_2$H$_4$OCH$_3$)$_3$.

Each of these silane couplers can be favorably used. It is suitably selected for use depending upon the particular purpose. For example, when it is blended with an organic resin which will be described hereinafter, it is selected taking into consideration the compatibility with the resin. Further, when it is blended with a solvent to obtain a hard coating liquid, it is suitably selected depending upon the type of the substrate to be coated.

For example, a coating film excellent in adhesion can be obtained when using a methyl acrylate type silane coupler for an acrylic resin substrate, a vinyl type silane coupler for other general resin substrates, and an epoxy type silane coupler for a metal substrate. When a substrate is a glass substrate, any type of silane couplers can be used for providing an excellent adhesion.

As the active hydrogen-containing compound (ii), compounds shown in the following I to IV may, for example, be mentioned.

I. Monohydric Alcohol

A C$_{2-12}$ monohydric alcohol, for example, an aliphatic compound such as ethanol, butanol, hexanol, heptanol, octanol or decanol, or a compound containing an aromatic ring, such as phenol, benzyl alcohol, 2-phenoxyethanol or 2,4-dimethylphenol.

II. Polyether Type Alcohol Having a Molecular Weight of from 80 to 500

The one having an alkylene oxide added to a monohydric alcohol or a monobasic carboxylic acid. The monohydric alcohol may, for example, be methanol, ethanol, propanol, butanol, phenol or benzyl alcohol. The monobasic carboxylic acid may, for example, be formic acid, acetic acid, butyric acid or benzoic acid. The alkylene oxide may, for example, be ethylene oxide, propylene oxide or butylene oxide.

III. Polyether Type Alcohol Having a Molecular Weight of at Least 500

① The one having one functional group

The one having at least 6 mol, preferably at least 10 mol, of an alkylene oxide added to a monohydric alcohol or a monobasic carboxylic acid to have a molecular weight of at least 500, preferably from 500 to 1,500. The monohydric alcohol, the monobasic carboxylic acid and the alkylene oxide may be the same as mentioned in II.

② The one having two functional groups

The one having at least 8 mol, preferably at least 10 mol, of an alkylene oxide added to a dihydric alcohol or a dibasic carboxylic acid to have a molecular weight of at least 500, preferably from 800 to 2,000. The dihydric alcohol may, for example, be ethylene glycol, propylene glycol, butanediol, bisphenol A, hydroquinone or catechol. The dibasic carboxylic acid may, for example, be maleic acid, succinic acid, adipic acid, phthalic acid or dimeric acid. The alkylene oxide may be the same as mentioned in II.

IV. Polyester Type Alcohol

The one obtained by an esterification reaction of a dibasic carboxylic acid with a dihydric alcohol to have a molecular weight of at least 500, preferably from 1,000 to 2,000. The dibasic carboxylic acid may be the same as mentioned in III. The dihydric alcohol may, for example, be alcohols as mentioned in III or the one having an alkylene oxide added to the dihydric alcohol mentioned in III.

By using the active hydrogen-containing compound (ii), it is possible to make the polyalkoxysiloxane of the present invention soluble in a polyisocyanate, whereby it is possible to obtain a useful isocyanate composition. In such a case, the blend ratio is preferably such that the ratio of polyisocyanate/(polyalkoxysiloxane+active hydrogen-containing compound) is from 90/10 to 10/90 (wt/wt), preferably from 80/20 to 40/60 (wt/wt). Further, other isocyanates, silicon surfactants and organic solvents, soluble to this composition, may further be incorporated thereto.

The above-described compounds (i) and (ii) are examples of the reactive organic compound which can be used in the present invention. The reactive organic compound useful in this invention is not limited to such specific examples, and any compound may be employed so long as it is a compound having a functional group capable of condensing with the polyalkoxysiloxane of the present invention and/or a group capable of forming a functional group capable of condensing with the polyalkoxysiloxane of the present invention, by hydrolysis.

Further, the above reactive organic compound may be a combination of two or more of such compounds, depending upon the particular purpose.

The amount of the reactive organic compound is usually at most 1 mol, preferably from 0.01 to 1 mol, more preferably from 0.05 to 0.5 mol, per mol of the alkoxy groups in the polyalkoxysiloxane. However, it may suitable be selected depending upon the particular purpose.

When a silane coupler is used as the reactive organic compound, water is added to hydrolyze the coupler, whereby the silane coupler undergoes a hydrolysis reaction to form a silanol group capable of condensing with alkoxy group of the polyalkoxysiloxane. When the polyalkoxysiloxane of the present invention is blended with such a reactive organic compound, a solvent, a dispersion medium or a curing catalyst may be added as the case requires.

For example, when forming a film as mentioned below, particularly in the case of spraying method or dipping method, such a solvent or dispersion medium may be added to adjust a viscosity or a non-volatile component content of a coating solution depending on the coating conditions or the aimed film properties such as a film thickness.

A solvent having a compatibility with both the polyalkoxysiloxane and the reactive organic compound is preferable. Examples of such a solvent include alcohols, glycol derivatives, hydrocarbons, esters, ketones and ethers, and these may be used respectively alone or in a mixture of two or more.

Examples of the alcohols include methanol, ethanol, isopropyl alcohol, n-butanbol, isobutanol and octanol, and examples of the glycol derivatives include ethylene glycol, ethylene glycol monomethyl ether, ethylene glycol monoethyl ether, ethylene glycol mono n-propyl ether and ethylene glycol mono n-butyl ether.

Examples of the hydrocarbons include benzene, kerosine, toluene and xylene, and examples of the esters include methyl acetate, ethyl acetate, butyl acetate, methyl acetoacetate and ethyl acetoacetate. Also, examples of the ketones include acetone, methyl ethyl ketone, methyl isobutyl ketone and acetyl acetone, and examples of the ethers include ethyl ether, butyl ether, 2-α-methoxyethanol, 2-α-ethoxyethanol, dioxane, furan and tetrahydrofuran.

If desired, a dispersion medium can be used. A preferable example of the dispersion medium includes a water-surfactant type dispersion medium, and a general example of the surfactant includes an anionic, cationic or nonionic surfactant. Examples of the anionic surfactant include a carboxylate salt, a sulfonate salt, a sulfonic acid ester salt and a phosphoric acid ester, and examples of the cationic surfactant include a primary to tertiary amine-organic or inorganic acid salt, a quaternary ammonium salt and a polyoxyethylene alkylamine salt, and examples of the nonionic surfactant include a sorbitan dialkylester, a sorbitan alkylester-ethylene glycol condensate, an aliphatic alcohol polyethylene glycol condensate, an alkylphenol polyethylene glycol condensate and a polypropylene glycol polyethylene glycol condensate.

These surfactants are used usually in an amount of from 0.1 to 5% to the polyalkoxysiloxane of the present invention, and dispersion (emulsification) can be made with an appropriate amount of water by using a homomixer, a colloid mill, an ultrasonic device or other known means.

Among these solvents and dispersion media, it is usually preferable to employ a solvent since it provides satisfactory physical properties of a cured product and a satisfactory stability of a curable composition. The type of a solvent used is selected depending on the aimed property of a cured product and treating conditions. For example, when hydrocarbons such as benzene, toluene and xylene or ketones such as methyl ethyl ketone are used for forming a film, a film having an excellent surface gloss and a desired film thickness can be easily obtained since a solvent removal rate at the time of curing a film is appropriate. In other aspects, generally, it may be optionally selected depending on the type of a reactive organic compound used and a desired film property.

When a reactive organic compound has many functional groups, it may be desired to add an additional catalyst for improving a curing rate after treatment.

The catalyst may, for example, be an inorganic acid such as hydrochloric acid, nitric acid, sulfuric acid or phosphoric acid, an organic acid such as acetic acid, paratoluenesulfonic acid, benzoic acid, phthalic acid, maleic acid, formic acid or oxalic acid, an alkaline catalyst such as potassium hydroxide, sodium hydroxide, calcium hydroxide or ammonia, an organic metal, a metal alkoxide, an organic tin compound such as dibutyltin dilaurate, dibutyltin dioctiate or dibutyltin diacetate, a metal chelate compound such as aluminum tris(acetylacetonate), titanium tetrakis(acetylacetonate), titaniumbis(butoxy) bis(acetylacetonate), titaniumbis(isopropoxy) bis(acetylacetonate), zirconium tetrakis(acetylacetonate), zirconiumbis(butoxy) bis(acetylacetonate) or zirconiumbis(isopropoxy) bis(acetylacetonate), or a boron compound such as boron butoxide or boric acid. However, it is preferred to employ one or more members selected from the group consisting of acetic acid, maleic acid, oxalic acid, fumaric acid and a metal alkoxide, from the viewpoint such that the storage stability of the curable composition, and the properties of the coating film such as hardness and flexibility obtained when it is used as a coating liquid, are excellent and from the viewpoint of corrosion prevention of a substrate to be treated.

The order of addition of such a solvent and a catalyst is not particularly limited, and they may be added at the same time as the reactive organic compound is added to the polyalkoxysiloxane of the present invention, or they may be added after the following compatible state has been accomplished.

The respective components in the silicon-containing composition, particularly the polyalkoxysiloxane and the reactive organic compound, may be present in a condensed state in the liquid or in a mere mixed state.

Such a state may be optionally selected depending upon the particular application and the type of the organic compound.

The condensation reaction may be accelerated by heating and/or by removing a by-product alcohol out of the system.

When various powders are treated with the polyalkoxysiloxane or the silicon-containing composition of the present invention, such treatment can be done by a common wet or dry method. For example, it is favorable for the dry method to use an apparatus suitable for drying and equipped with a mixing stirrer such as a Henschel mixer. The starting powders and a predetermined amount of the silicon-containing composition are charged, and the resultant mixture is stirred at room temperature until the surface of the starting powders is sufficiently wetted. Thereafter, while continuously stirring the mixture, the mixture is heated at 100 to 150° C. to promote the crosslinking reaction of the silicon-containing composition and to evaporate volatile components such as water, thereby obtaining surface-treated powders. If it is difficult to uniformly wet the starting powders with a predetermined amount of the silicon-containing composition, a predetermined amount of the silicon-containing composition may be diluted with water or the like. Also, in order to improve an affinity with a matrix, the starting powders may be previously surface-treated with the polyalkoxysiloxane of the present invention and/or with a solution of the polyalkoxysiloxane diluted with water, and may be further treated with the silicon-containing composition of the present invention after drying, if necessary.

The silicon-containing composition of the present invention has an excellent affinity with various substrates, and therefore, the starting powders to be treated therewith are not specially limited, examples of which include glass, cement, concrete, metals such as iron, copper, nickel, gold, silver, aluminum, rare earth metal and cobalt, carbonaceous materials such as carbon black, graphite, carbon fiber, activated carbon and carbon hollow spheres, oxides such as silica, alumina, titanium oxide, beryllium oxide, iron oxide, zinc oxide, magnesium oxide, tin oxide, antimony oxide, barium ferrite and strontium ferrite, hydroxides such as aluminum hydroxide and magnesium hydroxide, carbonates such as calcium carbonate and magnesium carbonate, sulfates such as calcium sulfate, silicates such as talc, clay, mica, calcium silicate, glass, glass hollow spheres and glass fibers, various inorganic powders such as calcium titanate, lead titanate-zirconate, aluminium nitride, silicon carbide and cadmium sulfide, wood powder, starch, various organic pigments, organic fillers such as polystyrene and nylon, and the like. Thus, both generally used fillers and functional fillers providing electroconductivity, electromagnetic wave-shielding property, magnetic property, sound-insulating property, heat conductivity, flame-retardant property, nonflammable property and wear resistance, can be treated with the silicon-containing composition of the present invention. The powders thus treated with the silicon-containing composition of the present invention are used as fillers for paints such as oil paint, synthetic resin paint, water soluble resin paint, emulsion paint, aggregate-containing emulsion paint, traffic paint, putty and caulking, rubber products such as shoe sole, electric wire, tire, industrial product, belt, hose, rubber-coated cloth, rubber cement, adhesive tape, latex and back sizing, paper uses for coating, lining and synthetic paper, synthetic resin products such as PVC, polyolefin, epoxy.phenol resin and unsaturated polyester, electric welding bar, glass, acid-neutralizing agent, pharmaceuticals, foods, sugar refining, tooth paste, cleanser, bunker sand, agricultural chemicals, assorted feeds, building materials and the like, or may be used as fillers for fibers and resin components to be molded for obtaining FRP (fiber reinforced plastic).

When a porous substrate such as paper is impregnated with the silicon-containing composition of the present invention, the substrate is dipped in the silicon-containing composition and is then dried. When crosslinking reaction is conducted at normal temperature or under heating, flame retardant property and smoothness can be provided. When the silicon-containing composition of the present invention is used as an adhesive, the surface to be bonded is coated with the silicon-containing composition and the surfaces to be bonded are press-bonded before completely curing. If the surface to be bonded is precoated with the polyalkoxysiloxane of the present invention, the bonding strength is further increased.

Further, to such a silicon-containing composition or a polyalkoxysiloxane of the present invention, a pigment may further be added to obtain a coating material, or various inorganic or organic fillers may be incorporated to obtain a curable composition, which may be cured to obtain a composite material.

In a case where a pigment is added to the polyalkoxysiloxane or the silicon-containing composition of the present invention to obtain a coating material, the pigment may be preliminarily dispersed in the reactive organic compound, so that a silicon-containing coating film having the pigment uniformly dispersed therein, can easily be obtained. A composition obtained by incorporating an organic resin such as a polyester, a polyurethane, an acrylic resin or a silicon resin, to the polyalkoxysiloxane or the silicon-containing composition of the present invention, may be used as a curable composition.

The blend ratio of the organic resin to the polyalkoxysiloxane or the silicon-containing composition may usually be within a wide range such that the organic resin is from 1 to 500 parts by weight per 100 parts by weight of the polyalkoxysiloxane as a non-volatile component content. For example, when it is desired to obtain properties such as high hardness and high heat resistance of the siloxane compound, the organic resin is preferably within a range of from 1 to 400 parts by weight. At that time, Si content as $SiO_2$ in the non-volatile component content of the blend liquid is from 10 to 95%. On the other hand, when it is desired to impart stain resistance and weather resistance to the coating film comprising the organic resin as the main component by using the polyalkoxysiloxane or the silicon-containing composition as an additive while maintaining the properties such as flexibility and thick-film forming property of the organic resin, the organic resin is preferably incorporated within a range of from 500 to 5,000 parts by weight. At that time, Si content as $SiO_2$ concentration in the non-volatile component content is within a range of from 1 to 10%.

Now, the present invention will be described in further detail with reference to Examples. However, it should be understood that the present invention is by no means restricted by such specific Examples.

EXAMPLE 1

Preparation of polymethoxysiloxane ④

Into a 3 l five necked glass flask equipped with a stirrer, a Dimroth condenser, a thermometer and a nitrogen supply tube, 1,520 g of tetramethoxysilane and 480 g of methanol were charged and stirred for 5 minutes and then a mixed liquid of 179 g of water and 0.36 g of 20% hydrochloric acid, was added thereto. The amount of water to tetramethoxysilane at that time, was 0.10 mol time.

Then, the mixture was heated to a reflux state (65° C.) and reacted for 4 hours under reflux.

Then, the Dimroth condenser was replaced by a Liebig condenser equipped with a branched connecting tube and a distillate receptor, and a very small amount of remaining methanol was distilled off under heating to an internal temperature of 150° C. Then, while maintaining the temperature at 150° C., highly pure nitrogen gas was blown into the liquid at SV=10 for 2 hours to distill off volatile components. Then, after natural cooling to room temperature, the content was taken out to obtain polymethoxysiloxane ① as a colorless transparent liquid.

This polymethoxysiloxane ① was subjected to $^1$H-NMR analysis, FT-IR analysis and silica analysis to determine a, b and c for the rational formula $SiO_a(OR)_b(OH)_c$.

Further, the molecular weight, the molecular weight distribution, the viscosity, the flash point and the methanol and tetramethoxysilane monomer contents, of this polymethoxysiloxane, were measured.

Further, the obtained polymethoxysiloxane ① was put into a sealed glass container and subjected to a storage stability test by accelerated storage at 50° C.

Calculation for the Rational Formula $^1$H-NMR Analysis 0.0122 g of TBE (tetrabromoethane) was added as the internal standard substance to 0.0139 g of a liquid sampled from polymethoxysiloxane ① of Example 1, and the mixture was diluted with 1.0177 g of $CDCl_3$ (chloroform-d), followed by $^1$H-NMR analysis to obtain the methoxy group content, whereby the methoxy group content was 0.0190 mol/g (sampled liquid).

The conditions for the $^1$H-NMR analysis are shown below, and the measured chart is shown in FIG. 1.

Conditions for the $^1$H-NMR Analysis
Apparatus: α-400 Model Fourier transform NMR apparatus, manufactured by JEOL
Resonance frequency: 400 MHz
Temperature for measurement: 23 to 26° C.
Pulse width: 4.8 μsec
Acquisition time: 2.04 sec
Pulse delay: 4.95 sec
Observation frequency width: 8,000 Hz
Data point number: 16384
Integration number of times: 32 times
Standard substance (0 ppm): tetramethylsilane
Diluting solvent: Chloroform-d
Internal standard substance for quantitative analysis: tetrabromoethane FT-IR Analysis The silanol group content in polymethoxysiloxane ① of Example 1 was measured as a methanol OH-converted silanol group content using FT-IR (Fourier transform infrared spectrophotometer), whereby it was 0.027 wt %. The conditions for the FT-IR analysis are shown below.

Apparatus: FT-IR (Magna 750, manufactured by Nicoray Co.)
Measuring method: liquid cell method (CaF$_2$ 5 mm in width)
Reagents: methanol(guaranteed reagent, manufactured by Ishizu Seiyaku K.K.) for calculation of absorption coefficient carbon tetrachloride (guaranteed reagent, manufactured by Wako Junyaku K.K.) for diluting sample
Dilution of the sample: sample/carbon tetrachloride=1/9 by weight ratio
Absorption band of silanol groups: 3,400 cm$^{-1}$
Difference spectrum method: corrected by subtracting the absorption spectrum of methanol which is contained in a very small amount Silica Analysis 3.013 g of a liquid sampled from polymethoxysiloxane ① of Example 1 was accurately weighed and put into a 25 ml platinum crucible, and 3.0 g of 14% aqueous ammonia was added thereto for gelation by hydrolysis. Then, formed methanol and remaining water were evaporated to dryness on a hot plate, followed by baking at 900° C. for 2 hours in an electric furnace to obtain 1.700 g of a white silica solid content.

The Si content as SiO$_2$ in the sample liquid was (1.700 g/3.013 g)×100=56.4 wt %.

Analysis of the Analytical Results: Calculation of the Rational Formula

Calculation of a, b and c of the rational formula SiO$_a$(OR)$_b$(OH)$_c$ (1) From the results of the silica analysis, Si mol in 100 g of polymethoxysiloxane ① obtained in Example 1 was:

(100 g×56.4/100)÷60.1=0.938 mol (2) b: amount of methoxy groups

From the results of the $^1$H-NMR analysis, the amount of methoxy groups in 100 g of polymethoxysiloxane ① obtained in Example 1 is:

100 g×0.0190 mol/g=1.90 mol.

Its amount per mol of Si is:

1.90÷0.938=2.03 mol/Si (3) c: amount of silanol groups

From the results of the FT-IR analysis, the amount of silanol groups in 100 g of polymethoxysiloxane ① obtained in Example 1 is:

(100 g×0.027/100)÷17≈1.6×10$^{-3}$ mol

Further, the amount per mol of Si is:

1.6×10$^{-3}$÷0.938=1.71×10$^{-3}$ mol/Si (4) a: the amount of siloxane groups

From the related formula of a=(4−b−c)÷2, a=(4−2.03−1.71×10$^{-3}$)÷2=0.984 mol/Si.

The above results are represented by the following rational formula:

SiO$_{0.984}$(OCH$_3$)$_{2.03}$(OH)$_{0.00171}$.

Molecular Weight and Molecular Weight Distribution

Figure 2:
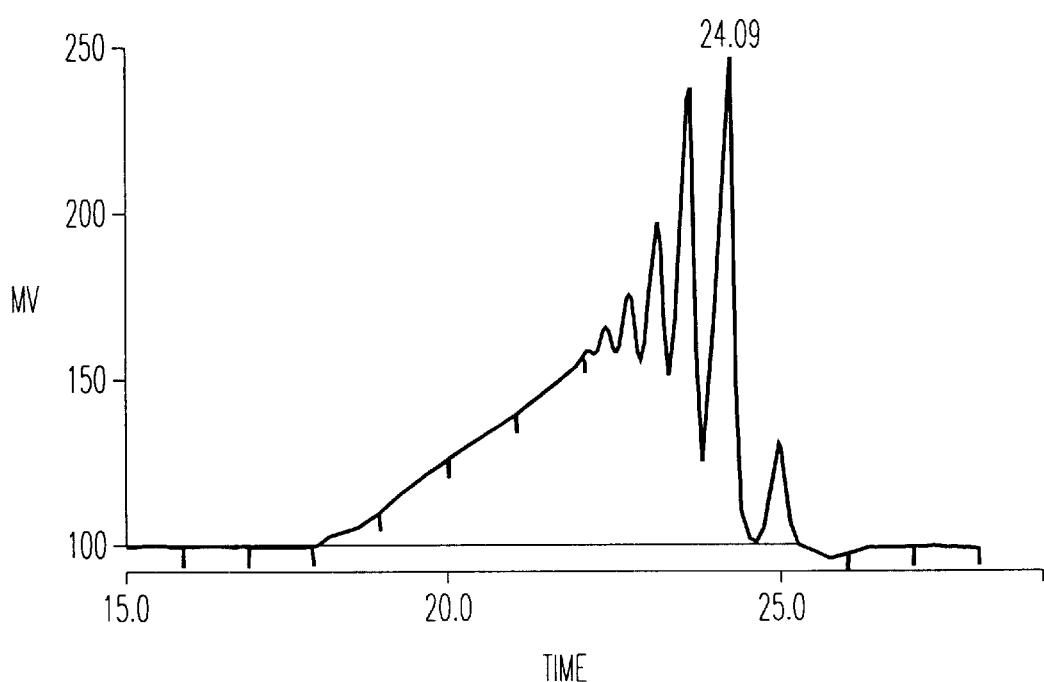
FIG. 2 is a GPC chart of polymethoxysiloxane ① obtained in Example 1.

As shown in FIG. 2, from the results of the GPC analysis, polymethoxysiloxane ① of Example 1 had a weight average molecular weight of 1024 and a molecular weight distribution of Mw/Mn=1.55 and Mz/Mw=1.74. The conditions for the GPC analysis were as follows.

Conditions for the GPC Analysis

Figure 3:
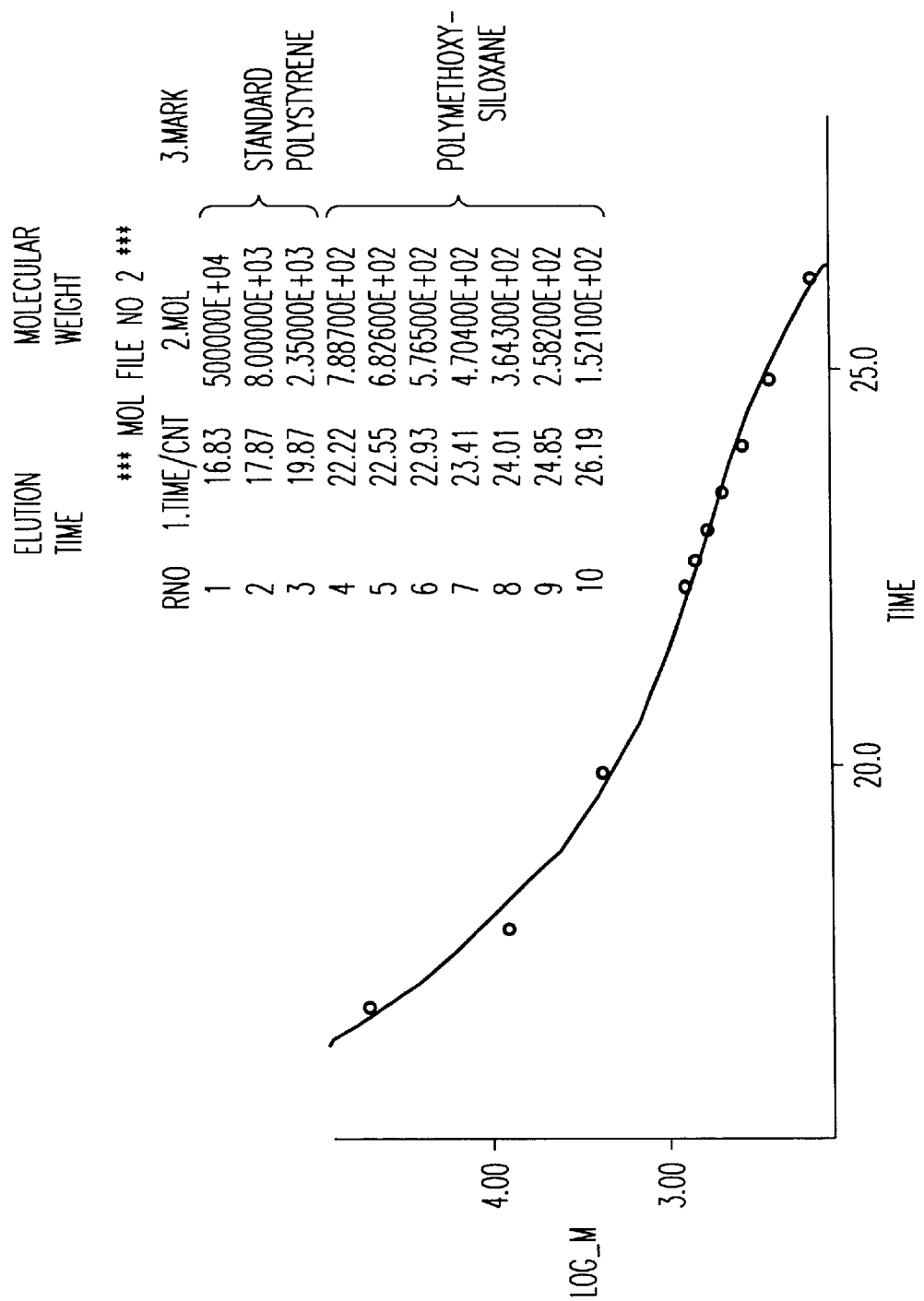
FIG. 3 is a GPC calibration curve obtained by using standard polystyrene and polymethoxysiloxane.

Apparatus: high temperature GPC, manufactured by Waters, 150° C.
Column: PLgel 500 Å (5μ) one column+100 Å (5μ) two columns
Temperature: column 40° C., injection 30° C., pump 30° C.
Solvent: chloroform, 1.0 ml/min
Detector: RI detector, 32×1 RIU/FS
Test sample: diluted with chloroform to 5 wt %, and 100 μl was injected
Chart rate: 5 mm/min
Data treatment: CP-8000, manufactured by TOSOH Corporation A GPC calibration curve obtained by using standard polystyrene and tetramethoxysilane oligomer, is shown in FIG. 3.

Mn (number average molecular weight), Mw (weight number molecular weight) and Mz (z average molecular weight) are obtained as follows:

$$Mn = \frac{\Sigma Hi}{\Sigma Hi/Mi}, Mw = \frac{\Sigma HiMi}{\Sigma Hi}, Mz = \frac{\Sigma HiMi^2}{\Sigma HiMi}$$

$\begin{pmatrix} Hi: \text{peak height of GPC chart at time } i \\ Mi: \text{molecular weight of GPC chart at time } i \end{pmatrix}$ Viscosity By means of an E-type viscometer, the viscosity at 25° C. of polymethoxysiloxane of Example 1 was measured and found to be 28.5 cP.

Flash Point

Using a Cleveland open-cup flash point measuring apparatus (a flash point measuring apparatus prescribed in JIS K2265-1980, 4.2.2), the flash point of polymethoxysiloxane ① of Example 1 was measured and found to be 172° C.

Contents of Methanol and Tetramethoxysilane Monomer

Figure 4:
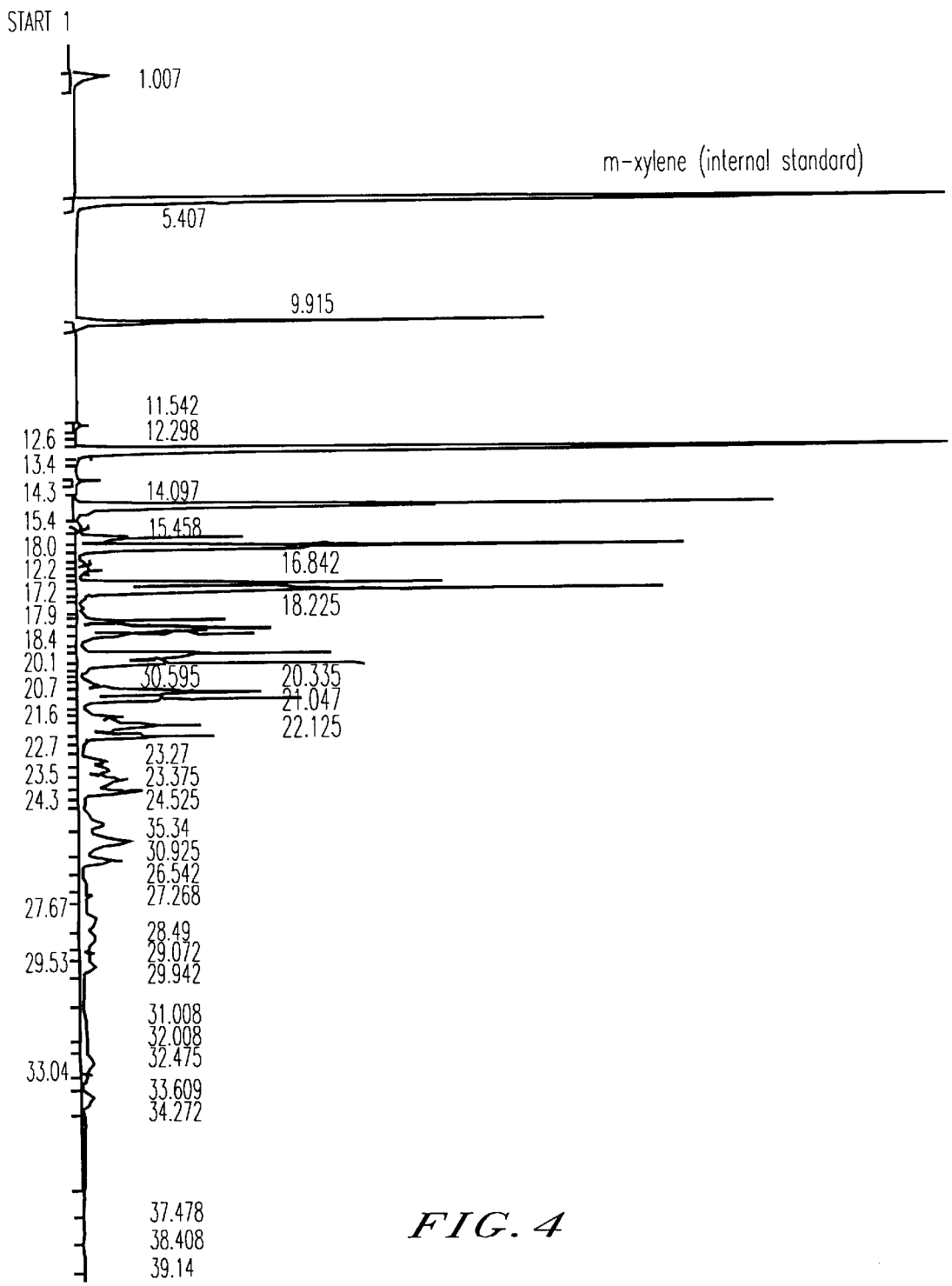
FIG. 4 is a GC chart of polymethoxysiloxane ① obtained in Example 1.

As shown in FIG. 4, from the GC (gas chromatograph) analysis, the content of tetramethoxysilane monomer in polymethoxysiloxane ① of Example 1 was not higher than 0.2 wt % (not higher than the lower limit for detection), and the content of methanol was 0.18 wt %.

The conditions for the GC analysis were as follows.
Conditions for the GC Analysis Apparatus: GC-14A, manufactured by Shimadzu Corporation
Column: Capillary column (J&W phased mega bore column DB-5)
Detector: TCD
Carrier gas: helium 8 ml/min
Make-up gas: helium 60 ml/min
Column temperature: 40 to 250° C., 10° C./min temperature rising gas chromatography
Injection temperature: 270° C.
Detector temperature: 270° C.
Electric current: 75 mA
Internal standard substance: m-xylene
Injected amount of the test sample: 0.5 μl
Internal standard/test sample: 0.2/2 g
Storage Stability Test About 80 ml of the obtained polymethoxysiloxane ① was put into a 100 ml heat resistant glass container and tightly sealed, and then it was stored in a constant temperature vessel maintained at 50° C. About 1.5 months later (room temperature-converted number of days: about one year) and about 3 months later (room temperature-converted number of days: about 2 years), it was subjected to the viscosity measurement at 25° C., the GC (gas chromatograph) analysis and the GPC analysis, to investigate the changes with time.

As a result, even upon expiration of about 2 years as the room temperature-converted number of days, no substantial changes in the liquid viscosity and the liquid composition were observed, and the storage stability was excellent. The results are shown in Table 1.

EXAMPLE 2

Preparation of polymethoxysiloxane ②

Polymethoxysiloxane ② as a colorless transparent liquid was prepared in the same manner as in Example 1 except that the amount of water was changed from 179 g to 198 g. The amount of water to tetramethoxysilane at that time, was 1.10 mol times.

The respective analytical results are shown below.
Si content as $SiO_2$: 59.0 wt % (Si content: 0.982 mol/100 g)
Amount of methoxy groups: 1.79 mol/100 g (1.82 mol/Si)
Amount of silanol groups: 0.021 wt % ($1.26 \times 10^{-3}$ mol/Si)
Amount of siloxane groups: $(4-1.82-1.26 \times 10^{-3}) \div 2 =$ 1.089 mol/Si From the above results, the rational formula was determined to be as follows:

$$SiO_{1.09}(OCH_3)_{1.82}(OH)_{0.0013}.$$

In the same manners as in Example 1, the molecular weight, the molecular weight distribution, the viscosity, the flash point and the methanol and tetramethoxysilane monomer contents, of polymethoxysiloxane ② were measured, and the result are shown below.

Molecular Weight and Molecular Weight Distribution

Figure 6:
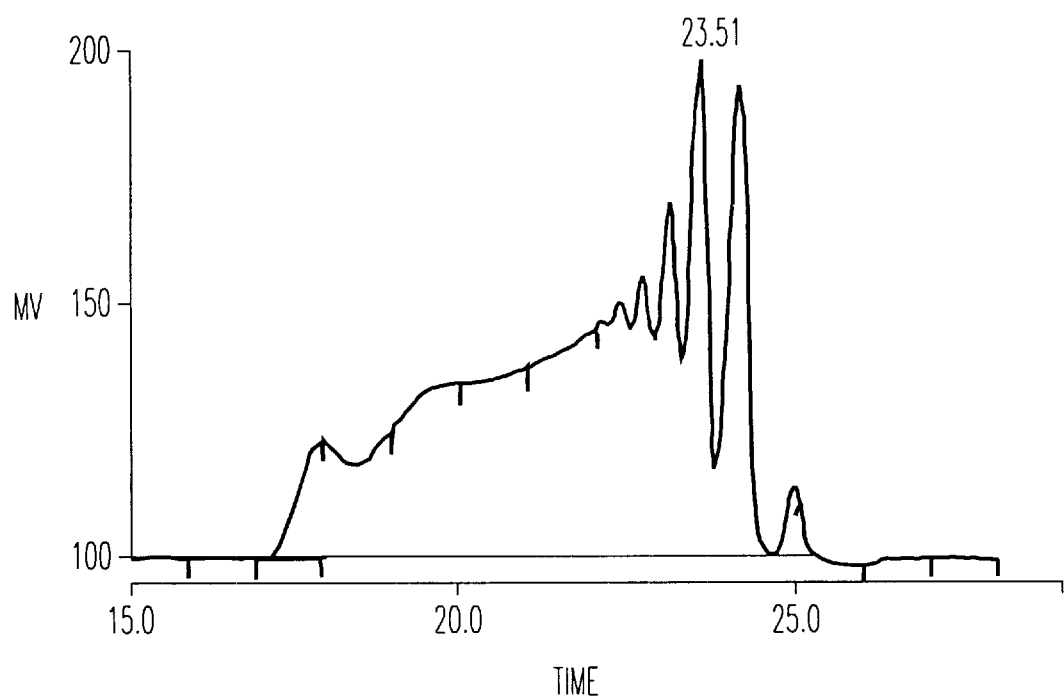
FIG. 6 is a GPC chart of polymethoxysiloxane ② obtained in Example 2.

The GPC chart is shown in FIG. 6. The weight average molecular weight was 1815, and the molecular weight distribution was Mw/Mn=2.23 and Mz/Mw=2.59.

Viscosity
82.0 cP

Flash Point
180° C.

Contents of Methanol and Tetramethoxysilane Monomer

The tetramethoxysilane monomer content was not higher than 0.2 wt % (not higher than the detectable lower limit), and the methanol content was also not higher than 0.2 wt % (not higher than the detectable lower limit).

Figure 7:
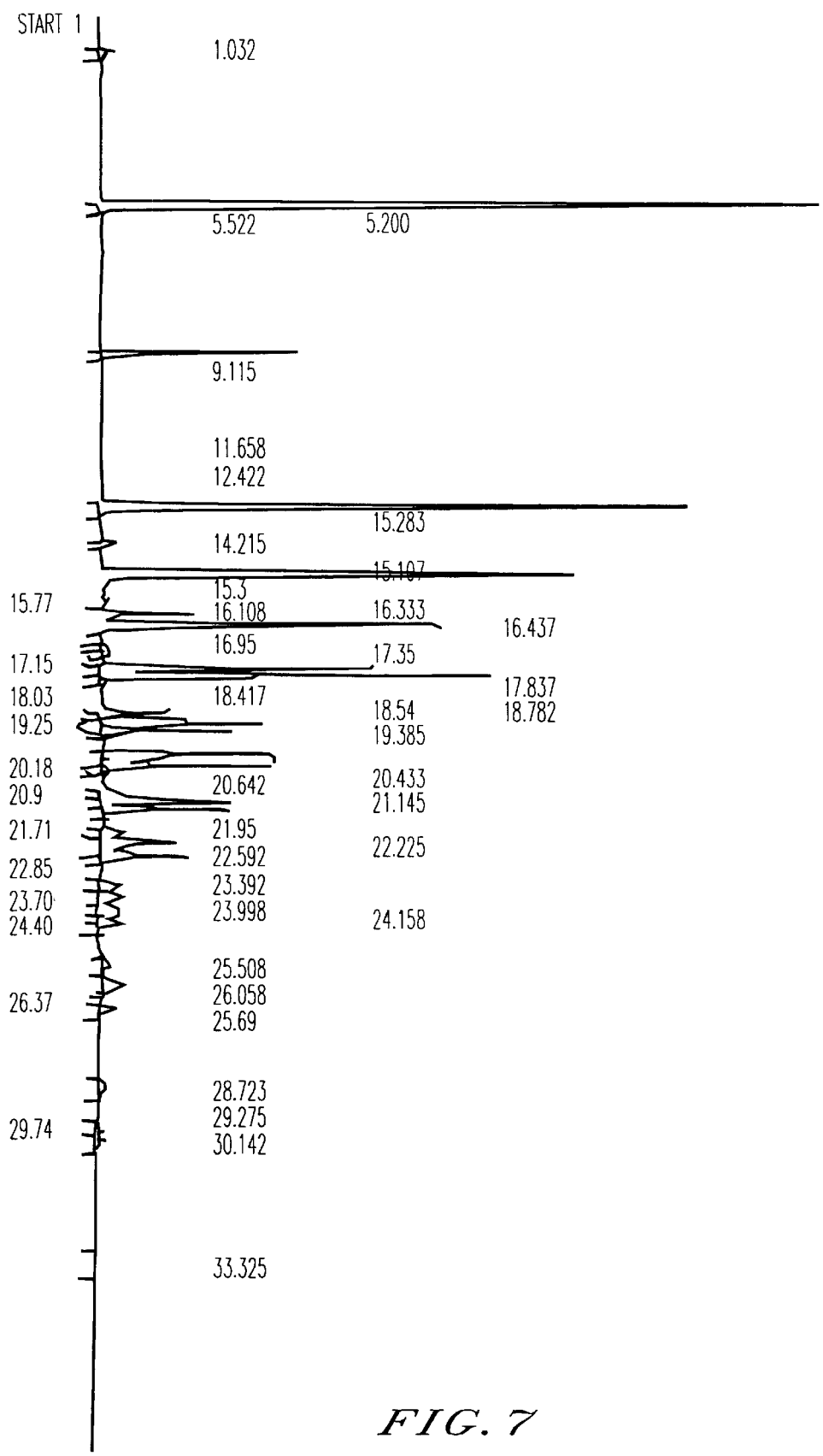
FIG. 7 is a GC chart of polymethoxysiloxane ② obtained in Example 2.

The GC chart is shown in FIG. 7.

Storage Stability Test

The storage stability test of the obtained polymethoxysiloxane ② was carried out in the same manner as in Example 1. As a result, even upon expiration of about 2 years as the room temperature-converted number of days, no substantial changes in the liquid viscosity and the liquid composition were observed, and the storage stability was excellent. The results are shown in Table 1.

TABLE 1

Storage stability test of polymethoxysiloxanes obtained in Examples 1 and 2

| Identification of sample | | Polymethoxysiloxane ① | | | Polymethoxysiloxane ② | | |
|---|---|---|---|---|---|---|---|
| Storage at 50° C. (number of days) | | Start | 45 | 91 | Start | 45 | 91 |
| Room temperature-converted number of days (number of years) | | | 1 | 2 | | 1 | 2 |
| Liquid viscosity at 25° C. (CP) | | 28.9 | 29.1 | 29.4 | 84.6 | 86.6 | 88.4 |
| GC analysis (%) | Methanol | 0.18 | 0.14 | 0.18 | 0.06 | 0.20 | 0.27 |
| | Tetramethoxysilane | ND | ND | ND | ND | ND | ND |
| | Dimer | 1.9 | 1.9 | 1.9 | 0.9 | 0.9 | 0.9 |
| | Trimer | 7.1 | 7.5 | 7.2 | 4.4 | 4.4 | 4.4 |
| | Total of dimer to octa-polymer | 41.0 | 40.5 | 39.0 | 26.8 | 26.6 | 25.0 |
| GPC analysis | Mn | 661 | | 663 | 814 | | 809 |
| | Mw | 1024 | | 1094 | 1815 | | 2136 |
| | Mz | 1779 | | 2157 | 4695 | | 7128 |
| | Mw/Mn | 1.55 | | 1.65 | 2.23 | | 2.64 |
| | Mz/Mw | 1.74 | | 1.97 | 2.59 | | 3.34 |

Note:
The dimer and higher polymers in the GC analysis were calculated by using the factor of the dimer.

Calculation of the Rational Formula

In the same analytical manners as in Example 1, $^1$H-NMR analysis, FT-IR analysis and silica analysis were carried out to obtain the rational formula of polymethoxysiloxane ②.

Figure 5:
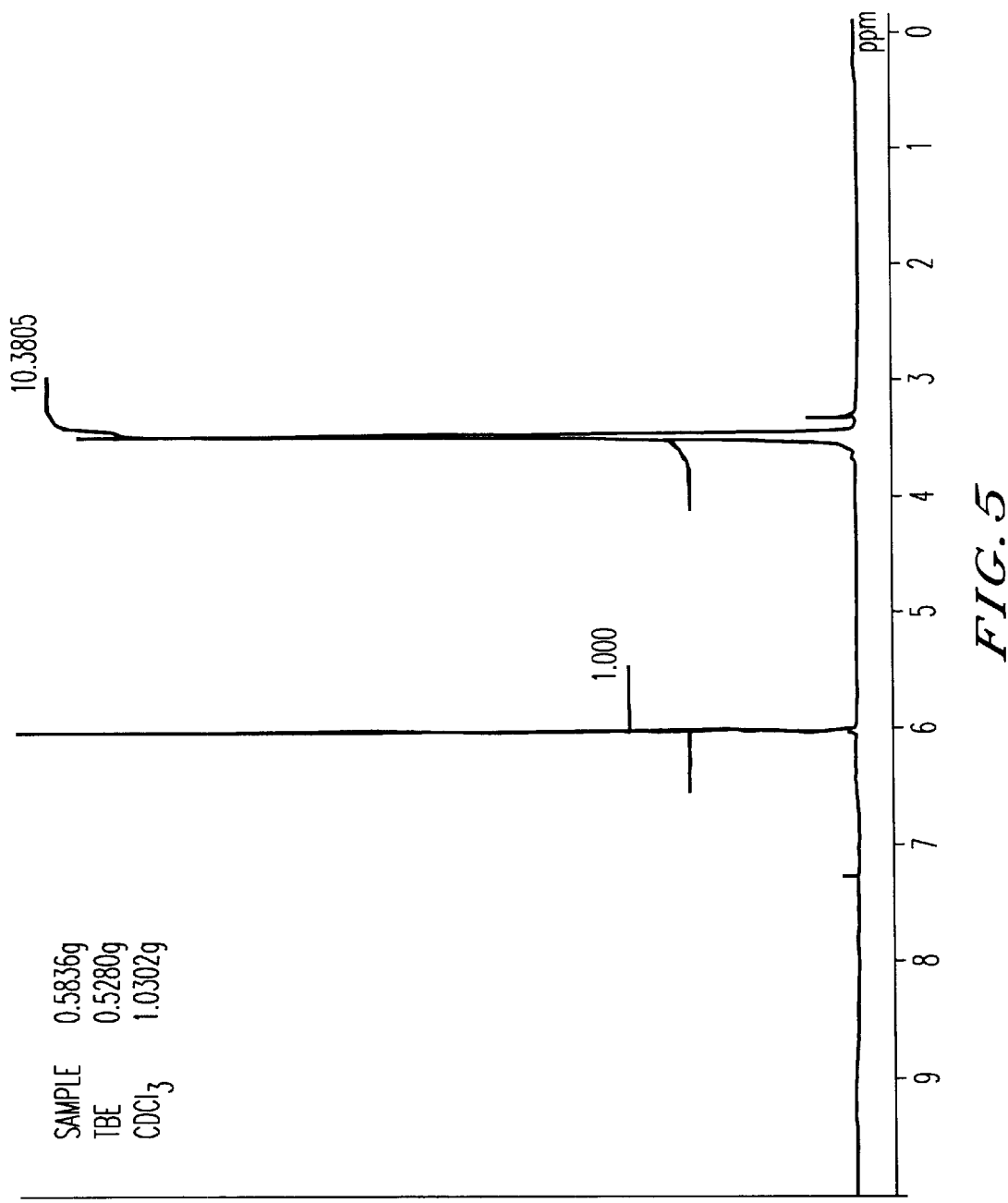
FIG. 5 is a $^1$H-NMR chart of polymethoxysiloxane ② obtained in Example 2.

The $^1$H-NMR chart is shown in FIG. 5.

EXAMPLE 3

Preparation of polymethoxysiloxane ③

Polymethoxysiloxane ③ as a colorless transparent liquid was prepared in the same manner as in Example 1 except that the amount of water was changed to 144 g, and 10% hydrochloric acid was changed to 0.10 g. The amount of water to tetramethoxysilane at that time was 0.80 mol time.

Figure 8:
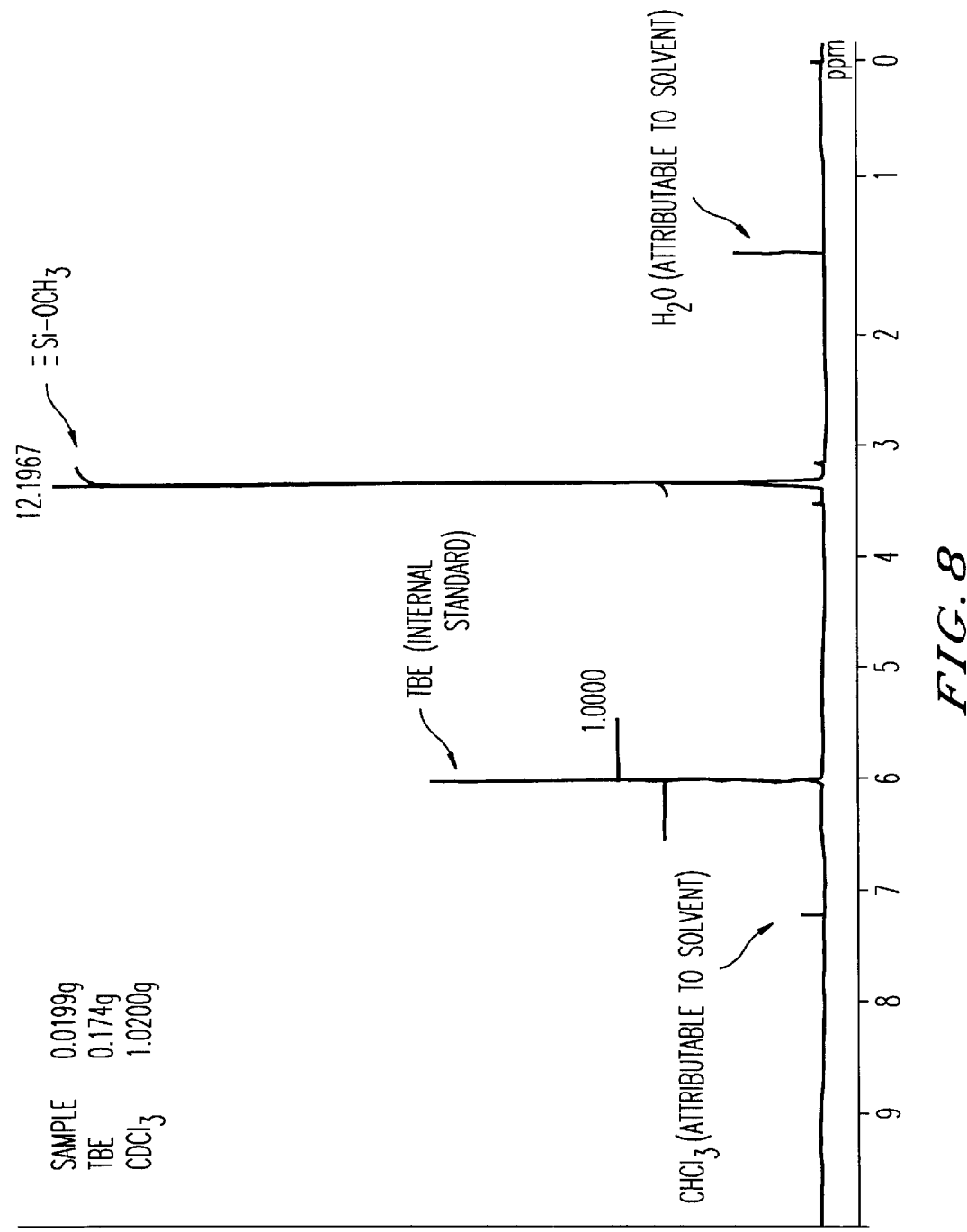
FIG. 8 is a $^1$H-NMR chart of polymethoxysiloxane ③ obtained in Example 3.

Then, in the same analytical manners as in Example 1, $^1$H-NMR analysis, FT-IR analysis and silica analysis were carried out. The $^1$H-NMR chart is shown in FIG. 8.

Further, the respective analytical results are shown below.

Si content as $SiO_2$: 53.4 wt % (Si content: 0.889 mol/100 g)

Amount of methoxy groups: 2.03 mol/100 g (2.28 mol/Si)

Amount of silanol groups: 0.011 wt % ($7.2 \times 10^{-4}$ mol/Si)

Amount of siloxane groups: $(4-2.28-7.2 \times 10^{-4}) \div 2 = 0.860$ mol/Si

The above results are represented by the following rational formula:

$$SiO_{0.860}(OCH_3)_{2.28}(OH)_{0.0007}.$$

Comparative Example 1

Preparation of polymethoxysiloxane 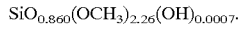

Polymethoxysiloxane 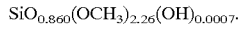 as a colorless transparent liquid (corresponding to MKC silicate MS51, tradename of a commercial product, manufactured by Mitsubishi Chemical Corporation) was prepared in the same manner as in Example 1 except that the amount of water was changed to 134 g, and 10% hydrochloric acid was changed to 0.10 g. The amount of water to tetramethoxysilane at that time was 0.75 mol time.

Figure 9:
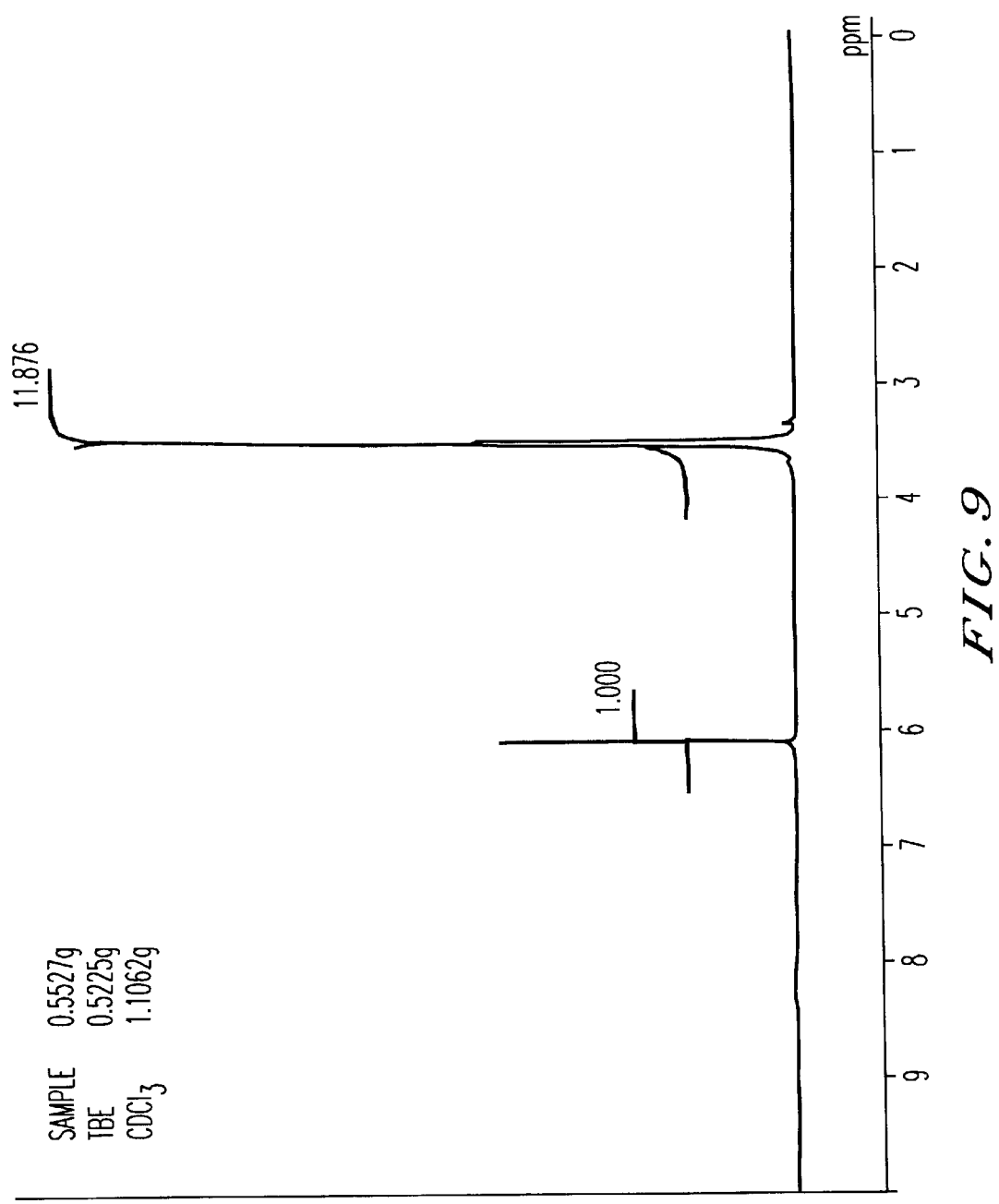
FIG. 9 is a $^1$H-NMR chart of polymethoxysiloxane ④ obtained in Comparative Example 1.

Then, in the same analytical manners as in Example 1, $^1$H-NMR analysis, FT-IR analysis and silica analysis were carried out. The $^1$H-NMR chart is shown in FIG. 9.

Further, the respective analytical results are shown below.

Si content as $SiO_2$: 52.4 wt % (Si content: 0.872 mol/100 g)

Amount of methoxy groups: 2.17 mol/100 g (2.49 mol/Si)

Amount of silanol groups: 0.009 wt % ($6.07 \times 10^{-4}$ mol/Si)

Amount of siloxane groups: $(4-2.49-6.07 \times 10^{-4}) \div 2 = 0.755$ mol/Si

The above results are represented by the following rational formula:

$$SiO_{0.755}(OCH_3)_{2.49}(OH)_{0.0006}.$$

In the same manners as in Example 1, the molecular weight, the molecular weight distribution, the viscosity, the flash point, and the methanol and tetramethoxysilane monomer contents, of polymethoxysiloxane 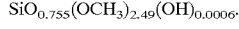, were measured, and the results are shown below.

Molecular Weight and Molecular Weight Distribution

Figure 10:
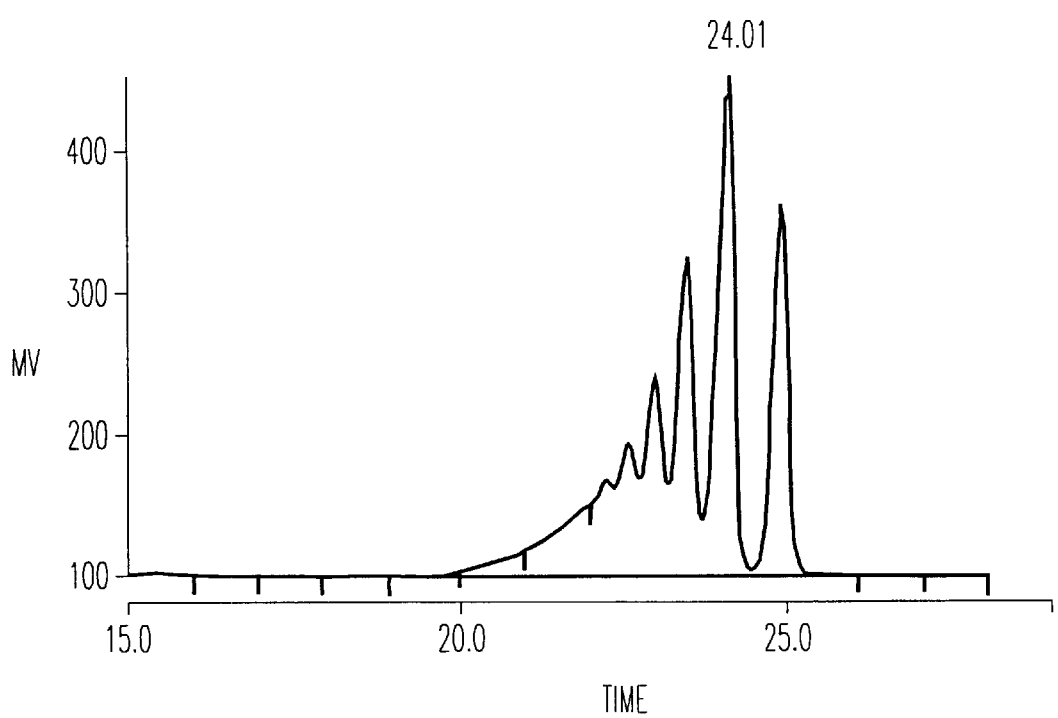
FIG. 10 is a GPC chart of polymethoxysiloxane ④ obtained in Comparative Example 1.

The GPC chart is shown in FIG. 10.

The weight average molecular weight was 537 and the molecular weight distribution was Mw/Mn=1.24 and Mz/Mw=1.33.

Viscosity
5.6 cP
Flash Point
126° C.
Contents of Methanol and Tetramethoxysilane Monomer The tetramethoxysilane monomer content was not more than 0.2 wt % (not more than the detectable lower limit), and the methanol content was also not more than 0.2 wt % (not more than the detectable lower limit).

Figure 11:
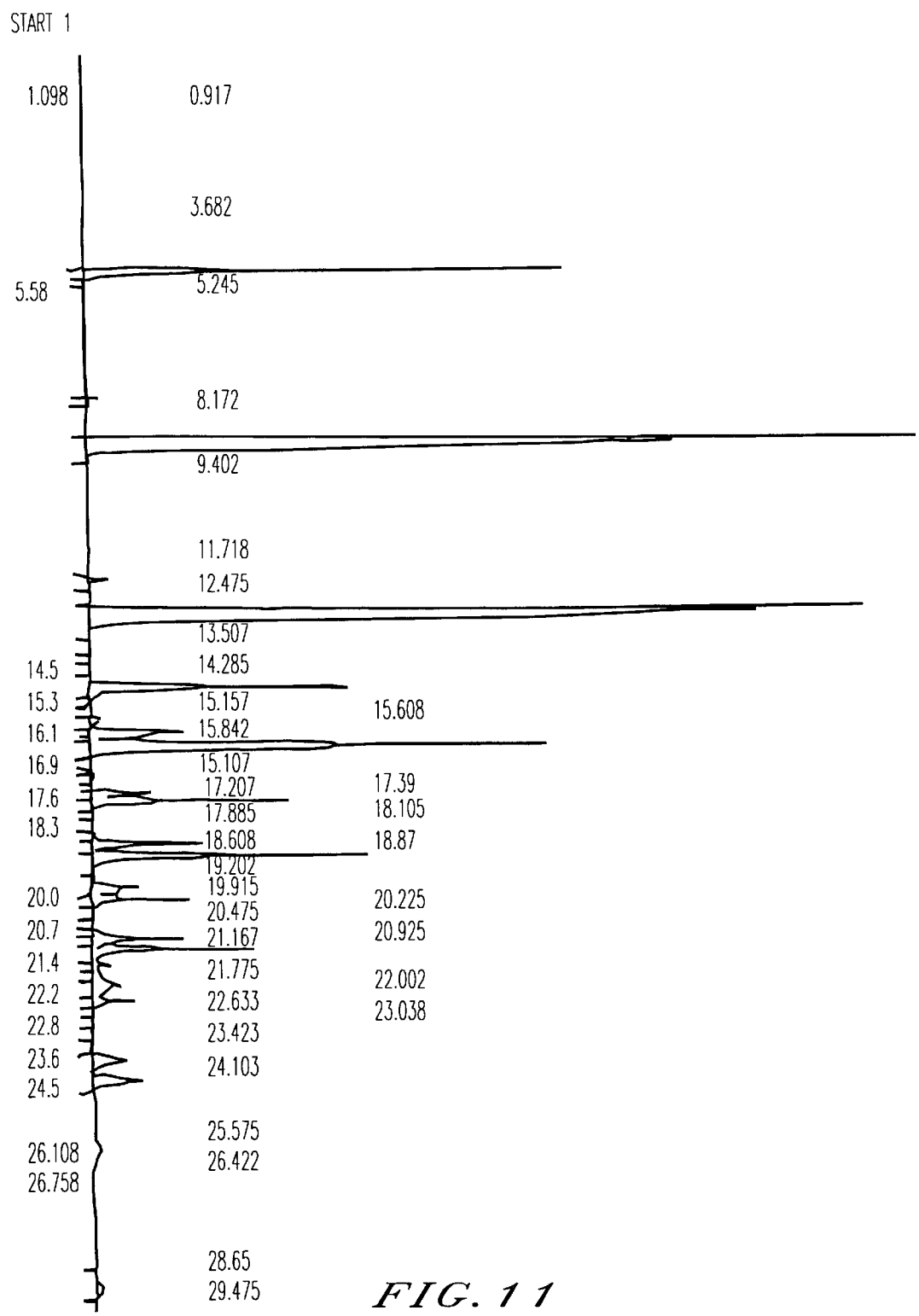
FIG. 11 is a GC chart of polymethoxysiloxane ④ obtained in Comparative Example 1.

The GC chart is shown in FIG. 11.

Comparative Example 2

Figure 12:
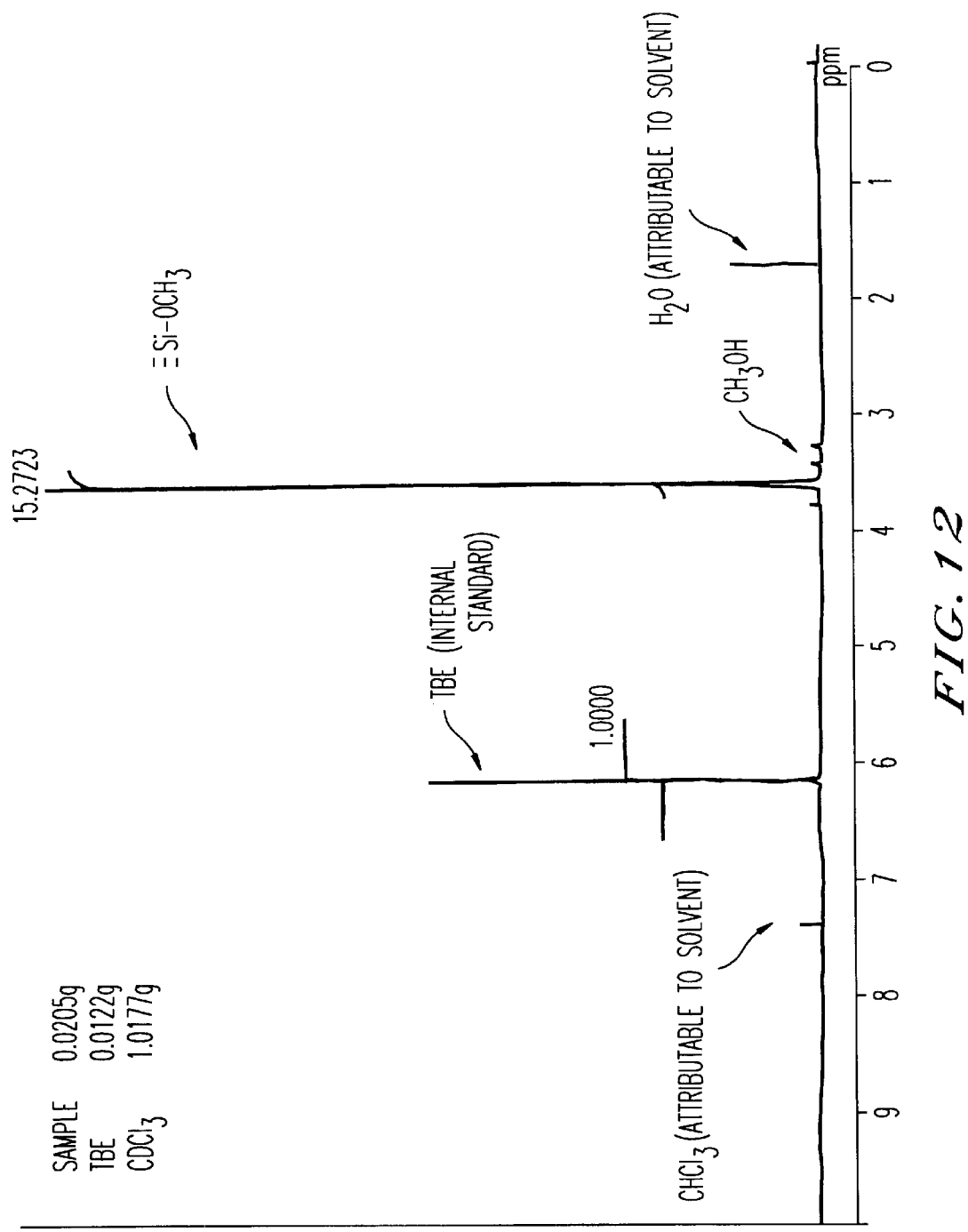
FIG. 12 is a $^1$H-NMR chart of polymethoxysiloxane of company C obtained in Comparative Example 2.

Commercial product polymethoxysiloxane manufactured by Company C (tradename: Methylsilicate 51) was subjected to $^1$H-NMR analysis, FT-IR analysis and silica analysis in the same analytical manners as in Example 1. The $^1$H-NMR chart is shown in FIG. 12.

The respective analytical results are shown below.

Si content as $SiO_2$: 51.4 wt % (Si content: 0.855 mol/100 g)

Amount of methoxy groups: 2.19 mol/100 g (2.56 mol/Si)

Amount of silanol groups: 0.050 wt % ($3.44 \times 10^{-3}$ mol/Si)

Amount of siloxane groups: $(4-2.56-3.44 \times 10^{-3}) \div 2 = 0.718$ mol/Si

The above results are represented by the following rational formula:

$$SiO_{0.718}(OCH_3)_{2.56}(OH)_{0.0034}.$$

In the same manners as in Example 1, the molecular weight, the molecular weight distribution, the viscosity, the flash point and the methanol and tetramethoxysilane monomer contents, of polymethoxysiloxane 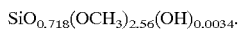 were measured. The results are shown below.

Molecular Weight and Molecular Weight Distribution

Figure 13:
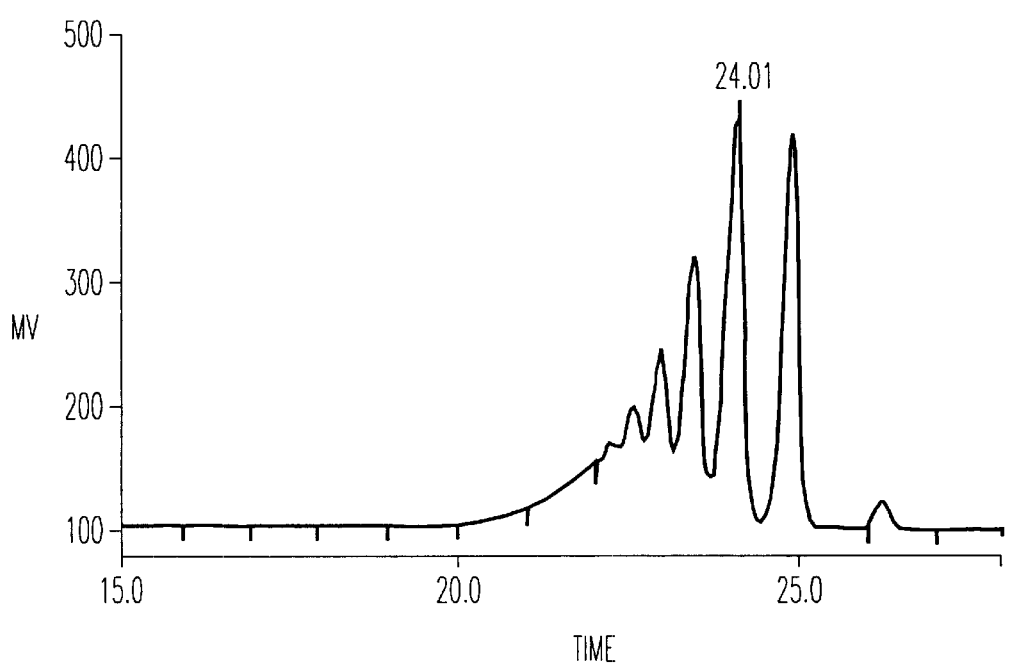
FIG. 13 is a GPC chart of the polymethoxysiloxane of company C obtained in Comparative Example 2.

The GPC chart is shown in FIG. 13.

The weight average molecular weight was 537, and the molecular weight distribution was Mw/Mn=1.24 and Mz/Mw=1.33.

Viscosity
5.3 cP
Flash Point
39.8° C.
Contents of Methanol and Tetramethoxysilane Monomer The tetramethoxysilane monomer content was 0.98 wt %, and the methanol content was 1.31 wt %.

Figure 14:
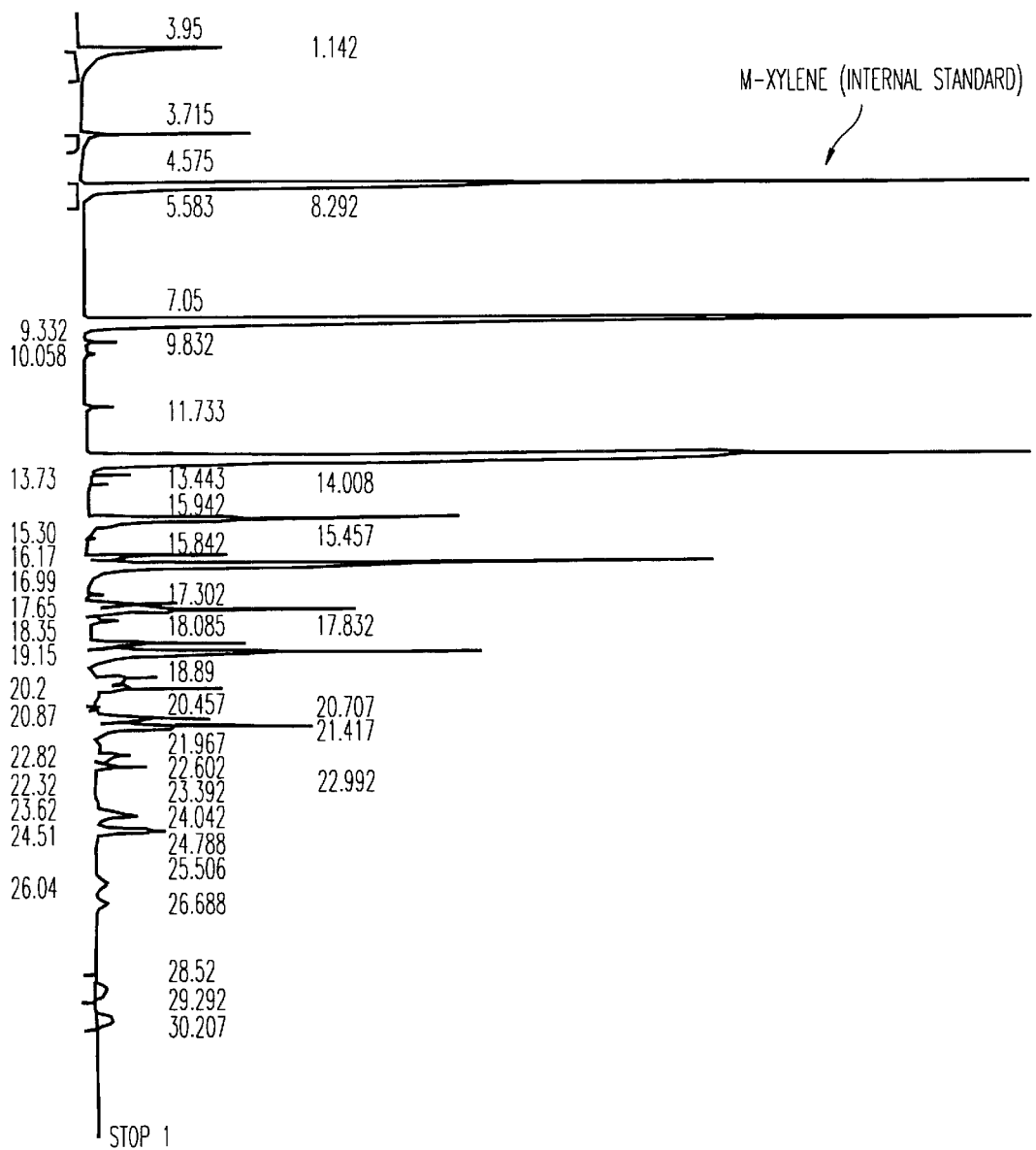
FIG. 14 is a GC chart of the polymethoxysiloxane of company C obtained in Comparative Example 2.

The GC chart is shown in FIG. 14.

EXAMPLE 4

Preparation of a tetraalkoxysilane

Into a 1 l metal (JIS SUS304) reactor equipped with an extraction tube having a metal (JIS SUS304) condenser, an alcohol supply tube, a metal (JIS SUS304) stirrer and a thermometer, 210 g of a metal silicon powder (particle size: 20 to 100 μm, purity: 99%), 3.7 g of cuprous chloride as a catalyst and 410 ml of dodecylbenzene were charged. Then, the reactor was heated, and when the inner liquid temperature reached 220° C., methyl alcohol was introduced at a rate of 300 ml/hr, followed by a reaction for 6 hours at a reaction temperature of 220° C. The extract liquid was collected in a glass container to obtain an extract (the reaction mixture) in a total amount of 1,720 g.

1,720 g of the reaction mixture thus obtained was charged into a 3 l glass flask equipped with a Dimroth condenser and a stirrer, and 2 g of calcium oxide was added thereto. Then, 1,000 ml of methyl alcohol was added and reacted with the reaction mixture. The reaction was carried out for 3 hours under a reflux condition (60° C.).

Then, a 10 plates Oldarshow type distillation column having an inner diameter of 3 cm was attached to the above flask, and distillation was carried out under a reflux ratio of 2 under atmospheric pressure to obtain 1,008 g of a component having a boiling point of from 120 to 121° C.

This component was analyzed by gas chromatography and found to be tetramethoxysilane monomer having a purity of 99%, which contained 0.5% of methyl trimethoxysilane. The analytical conditions of the gas chromatography were as follows.

Apparatus: GC-7A, manufactured by Shimadzu Corporation

Column: Fused silica megapore column DB-5, manufactured by J&W Co. (inner diameter: 0.53 mm, length: 30 m) Carrier gas: Helium gas 8 ml/min (mass flow control) Temperature: In the column, from 50° C. to 250° C. at a temperature rising rate of 8° C./min.

Inlet: 250° C.

Detector: 270° C.

Detector: FID detector

To prevent spreading of peaks, helium gas was introduced into the column outlet at a rate of 60 ml/min as a make up gas Internal standard: m-Xylene (sample/internal standard=10/1 weight ratio)

Injected amount: 0.5 µl (direct injection method)

Preparation of polymethoxysiloxane

Into a 3 l five-necked flask equipped with a stirrer, a Dimroth condenser, a thermometer and a nitrogen supply tube, 1,520 g of tetramethoxysilane and 480 g of methanol were charged and stirred for 5 minutes. Then, 179 g of water and 0.36 g of 20% hydrochloric acid were added thereto. Then, the mixture was heated to a reflux condition (65° C.) and reacted at 65° C. for 4 hours. Then, the Dimroth condenser was replaced by a branched tube equipped with a Liebig condenser and a receptacle, and heating was conducted until the internal temperature became 150° C., and the internal temperature was maintained to distill methanol over a period of 2 hours, to obtain a polymethoxysiloxane as a transparent liquid. It was cooled naturally to room temperature, and the content was sampled, whereupon the weight average molecular weight was measured by GPC as calculated as standard polystyrene, whereby it was found to be 1,060. By the gas chromatography, an oligomer having a degree of polymerization of from 2 to 8 was confirmed. The methanol-converted OH concentration was 0.09 wt %. The methanol content was 0.08 wt %. The Si content as SiO$_2$ was 57.1%.

EXAMPLE 5

The operation was carried out in the same manner as in Example 4 except that the amount of water was changed from 179 g to 215 g, to obtain a polymethoxysiloxane in a liquid state. The weight average molecular weight was 2,090. The methanol-converted OH concentration was 0.14 wt %. The methanol content was 0.12 wt %. The Si content as SiO$_2$ was 62.3%.

According to the present invention, it is possible to obtain a polymethoxysiloxane which is represented by a rational formula within the specific range and is a highly concentrated silicon-containing material having a higher degree of polymerization than the conventional polymethoxysiloxanes and which is, at the same time, a liquid excellent in the storage stability and transparency.

Further, the polymethoxysiloxane obtained by the present invention is useful as a hydrolyzed liquid for a hard coat, or applicable, as blended to various resins, to various applications such as an application as a coating agent or material, or as a binder for a sand mold for casting, or an application to various powder surface treatment, and it provides remarkable effects for e.g. imparting a hydrophilic nature, stain resistance, acid resistance, chemical resistance, weather resistance, electrical insulating property and heat resistance, which are attributable to the specific properties of inorganic silica.

What is claimed is:

1. A polyalkoxysiloxane of the following rational formula:

$$SiO_a(OR)_b(OH)_c$$

wherein R is a $C_{1-4}$ alkyl group, a=0.86 to 1.30, b=2.18 to 1.30, and c≦0.10.

2. A polyalkoxysiloxane having a flash point of at least 130° C.

3. A polyalkoxysiloxane having a silica-converted concentration of at least 53 wt %.

4. A polyalkoxysiloxane having a weight average molecular weight of from 600 to 3,000, a molecular weight distribution within ranges of Mw/Mn=1.4 to 2.7 and Mz/Mw=1.5 to 4.0, and a viscosity at 25° C. of from 10 to 1,000 cp.

5. The polyalkoxysiloxane according to claim 1, wherein the content of tetraalkoxysilane monomer is at most 0.5 wt %.

6. The polyalkoxysiloxane according to claim 1, wherein the content of an alcohol is at most 0.5 wt %.

7. A process for producing the polyalkoxysiloxane according to claim 1, which comprises reacting tetraalkoxysilane with from 0.80 to 1.30 mol times thereto of water for hydrolytic condensation under reflux, then distilling off an alcohol formed by the hydrolytic condensation and a solvent for reaction if used, at the boiling point, and then further distilling off components fractionated at from 120 to 200° C.

8. A silicon-containing composition comprising the polyalkoxysiloxane according to claim 1 and an organic compound having a group capable of condensing therewith and/or a group capable of forming a group capable of condensing therewith by hydrolysis.

9. The silicon-containing composition according to claim 8, wherein the organic compound is a silane coupler.

10. The silicon-containing composition according to claim 9, wherein the silane coupler is at least one member selected from the group consisting of compounds of the following formulas:

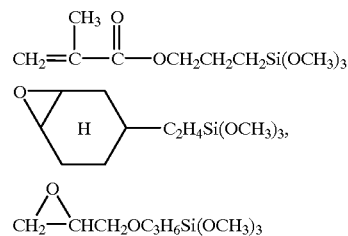

$H_2NC_3H_6Si(OC_2H_5)_3$, $H_2NC_2H_4NHC_3H_6Si(OCH_3)_3$, $H_2NCONHC_3H_6Si(OC_2H_5)_3$, $CH_2=CHSi(OC_2H_5)_3$, $CH_2=CHSi(OCH_3)_3$, $CH_2=CHSi(OC_2H_4OCH_3)_3$, $HS-C_3H_6Si(OCH_3)_3$, $HS-C_3H_6Si(OC_2H_5)_3$, $HS-C_3H_6Si(OC_2H_4OCH_3)_3$.

11. The silicon-containing composition according to claim 8, wherein the organic compound is an active hydrogen-containing compound.

12. A curable composition having an organic resin blended to the silicon-containing composition according to claim 8.

13. A curable composition comprising the polyalkoxysiloxane according to claim 1 and an organic resin.

14. An isocyanate composition having an isocyanate blended to the silicon-containing composition according to claim 8.

15. A curable composition having a powder blended to the silicon-containing composition according to claim 8.

16. A curable composition having a powder blended to the polyalkoxysiloxane according to claim 1.

17. A curable composition having a powder blended to the curable composition according to claim 12.

18. A cured product obtained by coating the curable composition according to claim 12, followed by curing.

* * * * *